United States Patent [19]
Hefner, Jr. et al.

[11] Patent Number: 5,276,184
[45] Date of Patent: Jan. 4, 1994

[54] SULFONAMIDE COMPOUNDS CONTAINING MESOGENIC MOETIES

[75] Inventors: Robert E. Hefner, Jr.; Jimmy D. Earls, both of Lake Jackson, Tex.

[73] Assignee: The Dow Chemical Company, Midland, Mich.

[21] Appl. No.: 562,289

[22] Filed: Aug. 3, 1990

[51] Int. Cl.$^5$ ............................................. C07C 311/03
[52] U.S. Cl. .............................................. 564/80; 564/82; 564/83; 564/84; 564/92; 564/93; 564/99; 528/96; 560/12; 560/13
[58] Field of Search .............. 528/96; 564/80, 83, 564/93, 82, 84, 92, 99, 92, 13

[56] References Cited

U.S. PATENT DOCUMENTS

| | | | |
|---|---|---|---|
| 2,181,085 | 11/1939 | Alquist et al. | 549/551 |
| 2,433,784 | 4/1943 | Popkin | 564/86 |
| 2,550,789 | 1/1948 | Edwards | 564/86 |
| 3,004,951 | 10/1961 | Dazzi | 528/102 |
| 3,133,033 | 5/1964 | St. Clair et al. | 523/450 |
| 3,291,775 | 12/1966 | Holm | 528/121 |
| 3,373,140 | 3/1968 | Aftergut | 525/523 |
| 3,374,203 | 3/1968 | Schmukler | 528/87 |
| 3,378,525 | 4/1968 | Sellers | 528/98 |
| 3,386,953 | 6/1968 | Dunnlag et al. | 525/523 |
| 3,484,408 | 12/1969 | Holm | 528/111 |
| 3,774,305 | 11/1973 | Stoffey et al. | 523/116 |
| 3,784,516 | 1/1974 | Baxter et al. | 525/495 |
| 3,907,768 | 9/1975 | van der Veen et al. | 534/566 |
| 3,919,317 | 11/1975 | Huff et al. | 564/276 |
| 4,027,950 | 6/1977 | Moriyama et al. | 359/106 |
| 4,045,408 | 8/1977 | Griffith et al. | 528/102 |
| 4,072,656 | 2/1978 | Hartman | 528/124 |
| 4,153,621 | 5/1979 | Hartman | 549/560 |
| 4,349,619 | 9/1982 | Kamoshida et al. | 430/196 |
| 4,499,255 | 2/1985 | Wang et al. | 528/95 |
| 4,499,304 | 2/1985 | Gabrielsen et al. | 564/99 |
| 4,594,291 | 6/1986 | Bertram et al. | 428/414 |
| 4,595,761 | 6/1986 | Chattha | 546/263 |
| 4,609,719 | 9/1986 | Chattha | 528/98 |
| 4,611,046 | 9/1986 | Chattha | 528/98 |
| 4,611,047 | 9/1986 | Chattha | 528/114 |
| 4,636,535 | 1/1987 | Wang et al. | 523/204 |
| 4,645,803 | 2/1987 | Kohli and Fisher | 525/423 |
| 4,663,401 | 5/1987 | Saito et al. | 525/505 |
| 4,717,674 | 1/1988 | Sung | 436/85 |
| 4,745,135 | 5/1988 | Thomas et al. | 521/114 |
| 4,745,136 | 5/1988 | Thomas et al. | 521/114 |
| 4,745,137 | 5/1988 | Thomas et al. | 521/137 |
| 4,762,901 | 9/1988 | Dhein et al. | 528/73 |
| 4,764,581 | 8/1988 | Mueller et al. | 528/100 |
| 4,791,154 | 12/1988 | Corley et al. | 523/456 |
| 4,798,849 | 1/1989 | Thomas et al. | 521/114 |
| 4,861,803 | 8/1989 | Turner | 521/37 |
| 4,962,163 | 10/1990 | Hefner, Jr. et al. | 525/463 |
| 5,024,785 | 6/1991 | Hefner, Jr. et al. | 252/299.01 |
| 5,077,380 | 12/1991 | Hefner, Jr. et al. | 528/128 |

FOREIGN PATENT DOCUMENTS

| | | | |
|---|---|---|---|
| 0379055 | 1/1990 | European Pat. Off. | 528/98 |
| 4217660 | 5/1964 | Japan | 528/98 |
| 56-152830 | 11/1980 | Japan | 528/98 |
| 58-206579 | 5/1982 | Japan | 528/98 |
| 62-96484 | 5/1987 | Japan | 528/98 |
| 63-10617 | 1/1988 | Japan | 528/98 |
| 1170105 | 2/1967 | United Kingdom | 528/98 |

OTHER PUBLICATIONS

*J. Pol. Sc.*, vol. 13, pp. 1757-1764 (1975).
Europ. Patent Appl. 252,358A (pub. Jan. 13, 1988 by Bayer AG, equivalent U.S. 4,764,581, Aug. 16, 1988 to Mueller et al) *J. Appl. Polym. Sci.*, Chattha et al, 1987, 33(5), 1829-1834.

(List continued on next page.)

*Primary Examiner*—John Kight, III
*Assistant Examiner*—Richard Jones

[57] ABSTRACT

Adducts containing mesogenic or rodlike moieties are prepared by reacting (1) at least one compound containing an average of more than one vicinal epoxide group per molecule with (2) at least one compound containing an average of more than one reactive hydrogen atom per molecule; with the proviso that at least one member of components (1) and (2) contains a mesogenic or rodlike moiety. These compounds are useful as curing agents for epoxy resins.

2 Claims, No Drawings

OTHER PUBLICATIONS

Chem. Abst. 101:24301d (*Vysokomol. Soedin., Ser. A*, Sierocka et al, 1984, 26(2),250-6.

Chem. Abst. 101:192592t (Eur. Polym. J., Sek, 1984 20(8), 805-9.

"Note a Photocrosslinkable Vinyl Polyester" by Sadafule et al. in *J. Mac. Sci.-Chem.*, A25(1), pp. 121-126 (1988).

Varma and Kothari in *Indian Journal of Technology*, vol. 21, pp. 265-267 (Jul. 1983).

Eichler and Mleziva in *Die Angewandte Makromolekulare Chemie*, vol. 19, #239, pp. 31-55 (1971).

Dobas and Eichler in Faserforshung und Textiltechnik, *Zeitschrift fur Polymerforschung*, 28, Nov. 12, pp. 589-594 (1977).

Chattha, Cassatta and Siegl in *Journal of Applied Polymer Science*, 33, pp. 1829-1834 (1987).

"Studies in the Photodimerization of the Diglycidyl Ether of 4,4'-Dihydroxychalcone" by Zahir, *J. app. Pol. Sc.*, vol. 23 pp. 1355-1372 (1975).

Chem. Abst. 104:6259d (Isv. Sev.-Kavk. Nauchn. Tsentra Vyssh Shk., Estestv. Nauki, Mokaeva et al, 1984, (4), 63-5.

Chem. Abst. 106:52298e (Japan. Kokai Tokkyo Koho JP 60 58,481).

Derwent 59720a/33 (J53 079998).

Derwent 61196w/37 (J5 0052-039).

Derwent 90978y/51 (J52 133885).

Derwent 84-004219/01 (SU 998946-A).

Chem. Abst. 60:5407 g (*Roczniki Chem.*, 37(9), pp. 1085-1087, 1963).

Chem. Abst. 90:138566d (Pol. Patent 97,557).

Chem. Abst. 92:59604c (Vysokomol. Soedin., Ser. B, 21(10), pp. 780-783, 1979).

Chem. Abst. 95:97564j (Pol. Patent 107,754).

Chem. Abst. 95:116389z (Polym. Bull. (Berlin), 4(8), pp. 479-485, 1981).

Copending application Serial Number 297,896 (Atty. Docket No. C-36,191A&B) filed Jan. 17, 1989 by Jimmy D. Earls and Paul M. Puckett, titled "Mesogenic Advanced Epoxy Compounds".

Copending app. Ser. No. 297,894 (Atty. Doc. No. C-37,281 filed Jan. 17, 1989 by Paul M. Puckett, Jimmy D. Earls and Michal B. Cavitt, titled "Dihyadroxybenzophenone Oximes, Their Prepartion and Rearrangement to the Anilide".

Copending app. Ser. No. 298,431 (Atty. Docket No. C-37,370A&B filed Jan. 17, 1989 by Jimmy D. Earls, Robert E. Hefner, Jr. and Paul M. Puckett, titled "Mesogenic Epoxy Compounds".

SULFONAMIDE COMPOUNDS CONTAINING MESOGENIC MOETIES

FIELD OF THE INVENTION

The present invention concerns adducts of epoxy resins which adducts contain one or more mesogenic or rodlike moieties, as well as thermosettable compositions containing one or more of said adducts and products resulting from curing the curable compositions.

BACKGROUND OF THE INVENTION

Adducts of epoxy resins, such as, for example, the diethylenetriamine adduct with the diglycidyl ether of bisphenol A, are known, for example, from page 7-16 of the *Handbook of Epoxy Resins*, by Henry Lee and Kris Neville, published by McGraw-Hill, Inc. (1967). These adducts find use as lower volatility, higher viscosity and modified reactivity curing agents for epoxy resins, relative to the free (unadducted) polyamine, per se. Daniel A. Scola in *Developments in Reinforced Plastics*-4 published by Elsevier Applied Science Publishers Ltd., England, pages 196-206 (1984) describes amine adducts of epoxy resins wherein the epoxy resin was selected from the diglycidyl ether of bisphenol A, tetraglycidyl 4,4'-diaminodiphenylmethane, triglycidyl p-aminophenol, epoxy phenol or cresol novalacs, hydrogenated diglycidyl ether of bisphenol A and combinations thereof and the amine was selected from the aliphatic, cycloaliphatic, aromatic and alkylaromatic diamines. Polymercaptan adducts of epoxy resins are also described, wherein the epoxy resin was selected from the diglycidyl ether of bisphenol A, an epoxy novalac blend, or a blend of the diglycidyl ether of bisphenol A with p-tertiarybutylphenolglycidyl ether and the polymercaptan was selected from 2,2'-dimercaptodiethyl ether, 1,2-dimercaptopropane, 1,3-dimercaptopropanol-2 and bis(2-mereaptoethylsulphide). Certain of the epoxy resin adducts provided cured epoxy resins with improvements in one or more physical and mechanical properties, such as, for example, tensile strength, tensile elongation, flexural strength, impact strength, moisture resistance and chemical resistance, relative to the free (unadducted) polyamine or polymercaptan, per se. J. Klee, et al. in *Crosslinked Epoxies* published by Walter de Gruyter and Co., Berlin, pages 47-54 (1987) describes the synthesis and analytical characterization of adducts of the diglycidyl ether of bisphenol A with primary monoamines including aniline, p-chloroaniline, benzylamine and cyclohexylamine. None of the aforementioned epoxy resin adducts or the epoxy resins cured with said adducts contain mesogenic or rodlike moieties.

The present invention provides adducts of epoxy resins containing one or more mesogenic or rodlike moieties. These adducts provide cured epoxy resins with improvements in many physical and mechanical properties, including, for example, tensile and flexural modulus, glass transition temperature, tensile strength and elongation, flexural strength and chemical resistance, relative to epoxy resins cured with epoxy resin adducts free of mesogenic or rodlike moieties. Incorporation of one or more mesogenic or rodlike structures into the curable epoxy resin formulation via the use of the adducts containing one or more mesogenic or rodlike moieties of the present invention can provide a susceptibility for molecular level orientation leading to a ordering of the thermoset thereof.

SUMMARY OF THE INVENTION

The present invention concerns adducts containing one or more mesogenic or rodlike moieties which are prepared by reacting
 (a) one or more epoxy resins containing one or more mesogenic or rodlike moieties, and
 (b) one or more materials free of mesogenic or rodlike moieties and containing two or more hydrogens which are reactive with an epoxide group selected from the group consisting of
  (1) di- and polyphenols,
  (2) di- and polycarboxylic acids,
  (3) di- and polymercaptans,
  (4) di- and polyamines,
  (5) primary monoamines,
  (6) sulfonamides,
  (7) aminophenols,
  (8) aminocarboxylic acids,
  (9) phenolic hydroxyl containing carboxylic acids,
  (10) sulfanilamides,
  (11) any combination of any two or more of such compounds, and the like; thereby forming an adduct essentially free of epoxy groups and containing active hydrogen atoms reactive with an epoxy group.

Another aspect of the present invention concerns adducts containing one or more mesogenic or rodlike moieties which are prepared by reacting
 (a) one or more epoxy resins free of mesogenic or rodlike moieties, and
 (b) one or more compounds containing one or more mesogenic or rodlike moieties and two or more hydrogens which are reactive with an epoxide group which compounds are selected from the group consisting of
  (1) di- and polyphenols,
  (2) di- and polycarboxylic acids,
  (3) di- and polymercaptans,
  (4) di- and polyamines,
  (5) primary monoamines,
  (6) sulfonamides,
  (7) aminophenols,
  (8) aminocarboxylic acids,
  (9) phenolic hydroxyl containing carboxylic acids,
  (10) sulfanilamides,
  (11) any combination of any two or more of such compounds, and the like; thereby forming an adduct essentially free of epoxy groups and containing active hydrogen atoms reactive with an epoxy group.

Another aspect of the present invention concerns adducts containing one or more mesogenic or rodlike moieties which are prepared by reacting
 (a) one or more epoxy resins containing one or more mesogenic or rodlike moieties, and
 (b) one or more compounds containing one or more mesogenic or rodlike moieties and two or more hydrogens which are reactive with an epoxide group, which compounds are selected from the group consisting of
  (1) di and polyphenols,
  (2) di and polycarboxylic acids,
  (3) di and polymercaptans,
  (4) di and polyamines,
  (5) primary monoamines, (6) sulfonamides,
(7) aminophenols,
(8) aminocarboxylic acids,
(9) phenolic hydroxyl containing carboxylic acids,
(10) sulfanilamides,
(11) mixtures thereof, and the like; thereby forming an adduct essentially free of epoxy groups and containing active hydrogen atoms reactive with an epoxy group.

Another aspect of the present invention concerns a sulfonamide compound containing at least one mesogenic rodlike moiety.

Another aspect of the present invention concerns thermosettable (curable) mixtures of one or more of the aforesaid adducts containing one or more mesogenic or rodlike moieties with one or more epoxy resins.

Another aspect of the present invention concerns the product resulting from thermosetting (curing) one or more of the aforesaid thermosettable (curable) mixtures.

A further aspect of the present invention pertains to products resulting from orienting any of the aforesaid thermosettable (curable) mixtures.

The term "mesogenic" as is used herein designates compounds containing one or more rigid rodlike structural units which have been found to favor the formation of liquid crystal phases in the case of low molar mass substances. Thus the mesogen or mesogenic moiety is that structure responsible for molecular ordering.

DETAILED DESCRIPTION OF THE INVENTION

Epoxy Resin Component

Suitable epoxy resins which can be employed herein include essentially any epoxy-containing compound which contains an average of more than one vicinal epoxide group per molecule. The epoxide groups can be attached to any oxygen, sulfur or nitrogen atom or the single bonded oxygen atom attached to the carbon atom of a —CO—O— group in which said oxygen, sulfur or nitrogen atom or the carbon atom of the —CO—O— group is attached to an aliphatic, aromatic or cycloaliphatic hydrocarbon group which hydrocarbon group can be substituted with any inert substituent including, but not limited to, halogen atoms, preferably chlorine or bromine, nitro groups and the like or such groups can be attached to the terminal carbon atoms of a compound containing an average of more than one —(O—CHR$^a$—CHR$^a$—)t group where each R$^a$ is independently hydrogen or an alkyl or haloalkyl group, containing from 1 to about 2 carbon atoms, with the proviso that only one R$^a$ group can be a haloalkyl group, and t has a value from 1 to about 100, preferably from 1 to about 20, more preferably from 1 to about 10, most preferably from 1 to about 5.

It should be understood that in those instances wherein it is required that the epoxy resin or epoxy-containing compound contain a mesogenic moiety that those epoxy resins or epoxy-containing compounds which do not contain a mesogenic moiety are not suitable for that particular purpose.

Particularly suitable epoxy resins which can be employed herein include those compounds having an average of more than one vicinal epoxide group per molecule, such as, for example, the glycidyl ethers or glycidyl amines represented by the following formulas

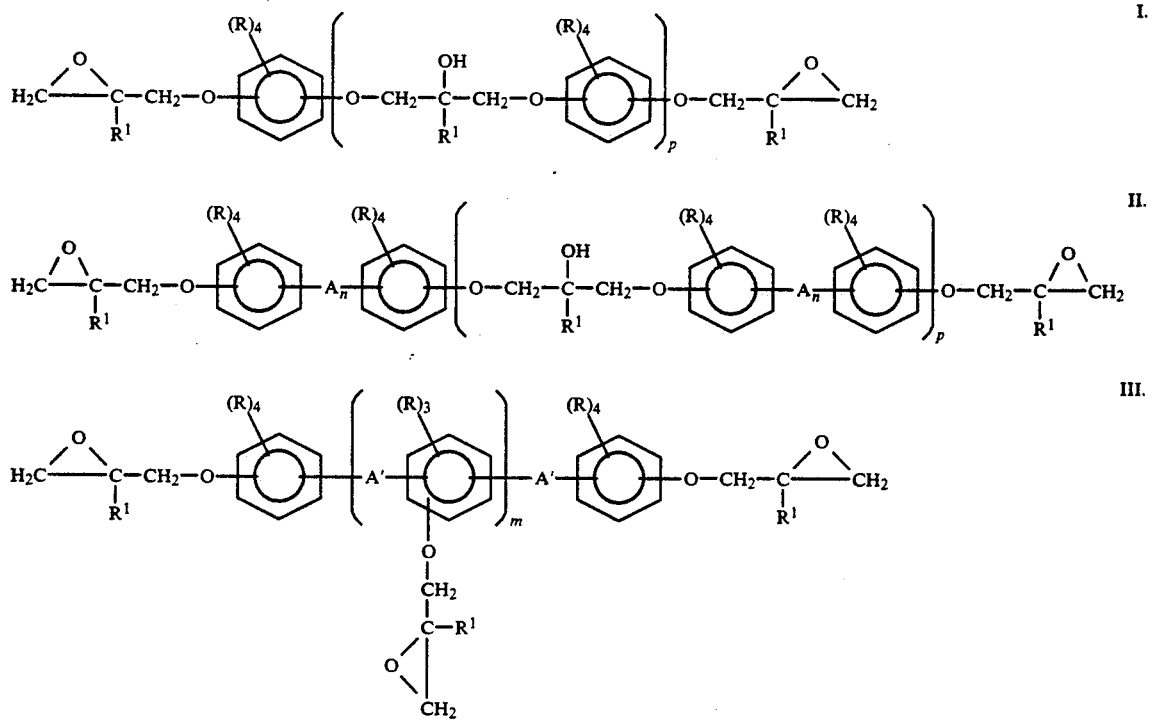

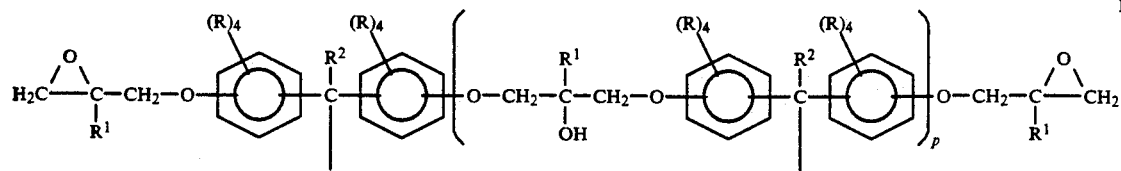

IV.

V.

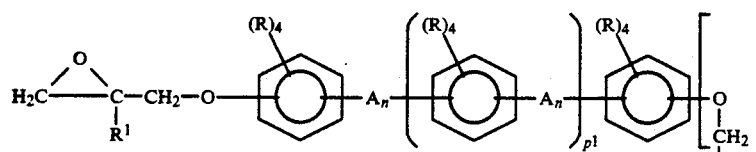

Formula VI.

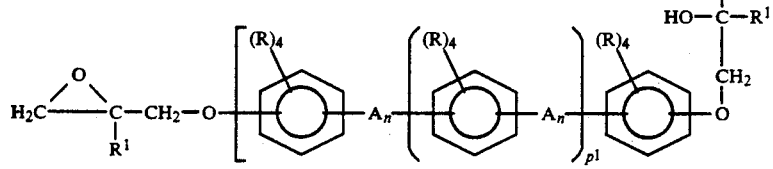

Formula VII.

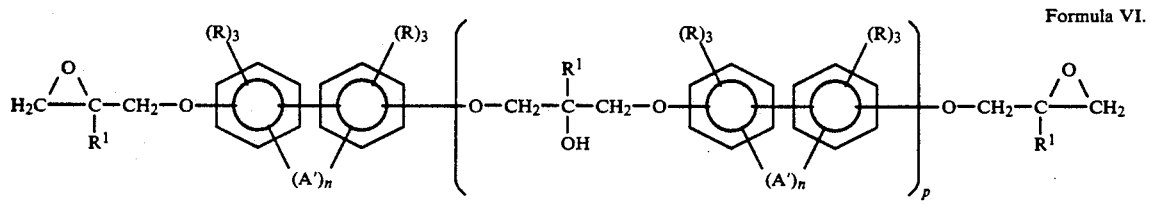

Formula VIII.

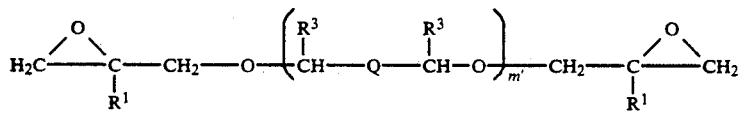

Formula IX.

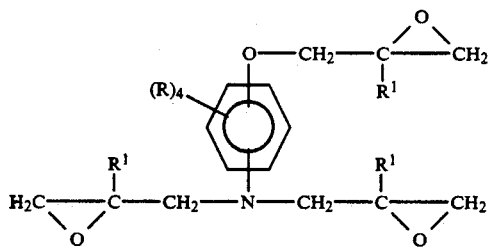

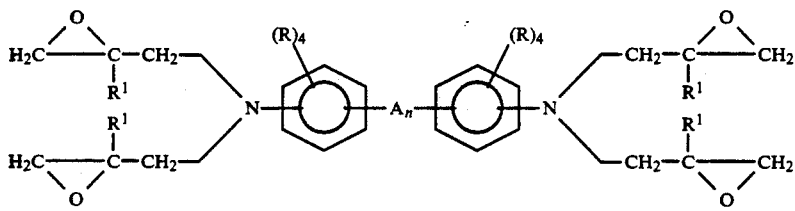

wherein each A is independently a direct single bond, a divalent hydrocarbyl group having from 1 to about 20, preferably from 1 to about 14, carbon atoms, —O—, —CO—, —SO—, —SO$_2$—, —S—, —S—S—, —CR$^1$=CR$^1$, —C≡C—, —N=N—, —CR$^1$=N—, —O—CO—, —NR$^1$—CO—, —CR$^1$=N—N=CR$^1$—, —CR$^1$=CR$^1$—CO—, —N=CR$^1$—, —CO—O—, —CO—NR$^1$—, —CO—CR$^1$=CR$^1$—, —CO—O—N=CR$^1$—, —CR$^1$=N—O—OC—, —CO—NR$^1$—NR$^1$—OC—, —CR$^1$=CR$^1$—O—OC—, —CO—O—CR¹=CR¹—, —O—OC—CR¹=CR¹—,
—CR¹=CR¹—CO—O—, —(CHR¹)-
$_{n'}$—O—CO—CR¹—, —CR¹=C-
R¹—CO—O—(CHR¹)$_{n'}$—, —(CHR¹)-
$_{n'}$—CO—O—CR¹=CR¹—, —CR¹=C-
R¹—O—CO—(CHR¹)$_{n'}$-, —CO—S—, —S—OC—,
—CH₂—CH₂—CO—O—, —O—OC—CH₂—CH₂-,
—C≡C—C≡C—, —CR¹=CR¹—CR¹=CR¹—,

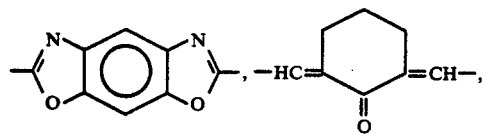

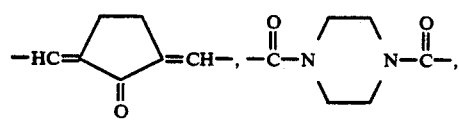

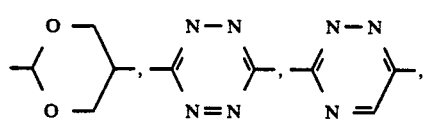

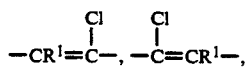

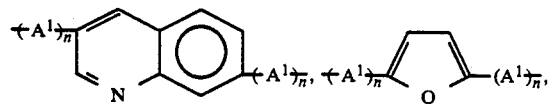

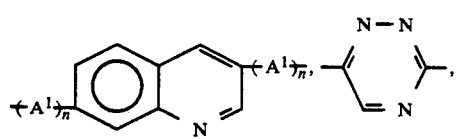

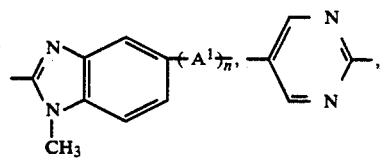

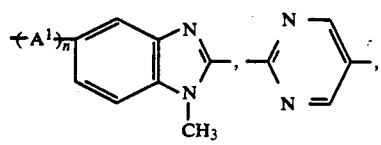

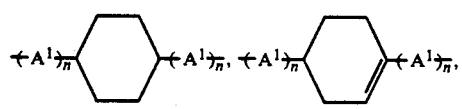

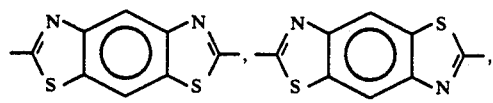

-continued

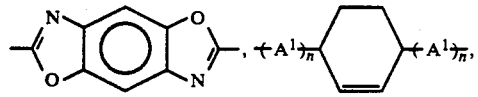

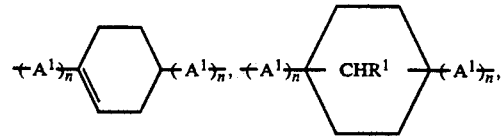

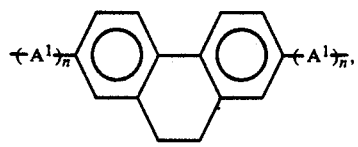

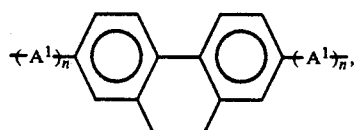

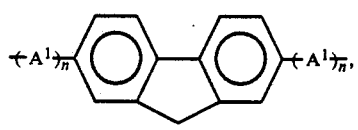

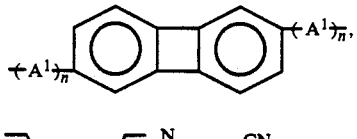

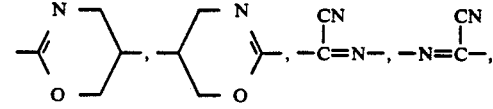

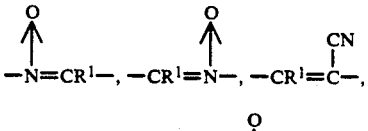

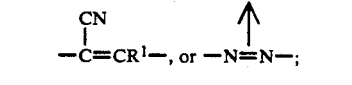

each A' is independently a divalent hydrocarbyl group having from 1 to about 10, preferably from 1 to about 4, carbon atoms; each A¹ is independently a

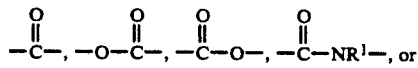

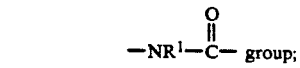 group;

each R is independently hydrogen or a hydrocarbyl or hydrocarbyloxy group having from 1 to about 10, preferably 1 to about 4, carbon atoms, a halogen atom, preferably chlorine or bromine, a nitro group, a nitrile group, a phenyl group or a —CO—R¹ group; each R¹ is independently hydrogen or a hydrocarbyl group having 1 to about 3 carbon atoms; each R² is independently hydrogen or a hydrocarbyl group having from 1 to about 10, preferably from 1 to about 3, carbon atoms, a halogen atom, preferably chlorine or bromine; each $R^3$ is independently hydrogen, or a hydrocarbyl or halohydrocarbyl group having from 1 to about 6, preferably 1 to about 2 carbon atoms; Q is a direct bond, —CH$_2$—S—CH$_2$—, —(CH$_2$)$_n''$—, or

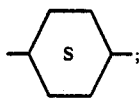

m has a value from about 0.001 to about 6, preferably from about 0.01 to about 3; m' has a value from 1 to about 10 preferably from about 1 to about 4; n has a value of zero or one; p has a value from zero to about 30, preferably from zero to about 5; n' has a value from 1 to about 6, preferably 1 to about 3; n'' has an average value from about 1 to about 10; and $p^1$ has a value from 1 to about 30, preferably from I to about 3. The aromatic rings can also contain one or more heteroatoms selected from N, O, S and the like.

The term hydrocarbyl as employed herein means any aliphatic, cycloaliphatic, aromatic, aryl substituted aliphatic or cycloaliphatic, or aliphatic or cycloaliphatic substituted aromatic groups. The aliphatic or cycloaliphatic groups can be saturated or unsaturated. When applied to the A' group of Formula VI, the hydrocarbyl group can also contain one or more heteroatoms selected from N, O, S and the like. Likewise, the term hydrocarbyloxy means a hydrocarbyl group having an oxygen linkage between it and the carbon atom to which it is attached.

Representative of the polyepoxide compounds which are free of mesogenic or rodlike moieties include, for example, the diglycidyl ethers of resorcinol, 4,4'-isopropylidenediphenol (bisphenol A), 4,4'-dihydroxybenzophenone (bisphenol K), 1,1-bis(4-hydroxyphenyl)-1-phenylethane (bisphenol AP), dihydroxydiphenylmethane (bisphenol F), 3,3',5,5'-tetrabromobisphenol A, 4,4'-thiodiphenol (bisphenol S), 4,4'-sulfonyldiphenol, 4,4'-dihydroxydiphenyl oxide, 3-phenylbisphenol A, 3,3'5,5'-tetrachlorobisphenol A, 3,3'-dimethoxybisphenol A, dipropylene glycol, poly(propylene glycol)s, thiodiglycol; the triglycidyl ether of tris(hydroxyphenyl)methane; the triglycidyl ether of p-aminophenol; the tetraglycidyl ether of 4,4'-diaminodiphenylmethane; the polyglycidyl ether of a phenol or substituted phenol-aldehyde condensation product (novolac); the polyglycidyl ether of a dicyclopentadiene or an oligomer thereof and phenol or substituted phenol condensation product; the advancement reaction products of the aforesaid di- and polyglycidyl ethers with aromatic di- or polyhydroxyl- or di- or polycarboxylic acid containing compounds including, for example, bisphenol A (4,4'-isopropylidenediphenol), o-, m-, p-dihydroxybenzene, 2,4-dimethylresorcinol, 4-chlororesoreinol, tetramethylhydroquinone, 1,1-bis(4-hydroxyphenyl)ethane, bis(4,4'-dihydroxyphenyl)methane, 4,4'-dihydroxydiphenyl ether, 3,3',5,5'-tetramethyldihydroxydiphenyl ether, 3,3',5,5'-dichlorodihydroxydiphenyl ether, 4,4'-bis(p-hydroxyphenyl iso-propyl)-diphenyl ether, 4,4'-bis(p-hydroxyphenoxy)-benzene, 4,4'-bis(p-hydroxyphenoxy)diphenyl ether, 4,4'-bis(4(4-hydroxyphenoxy)phenyl sulfone)diphenyl ether, 4,4'-dihydroxydiphenyl sulfone, 4,4'-dihydroxydiphenyl sulfide, 4,4'-dihydroxydiphenyl disulfide, 2,2'-dihydroxydiphenyl sulfone, 4,4'-dihydroxydiphenyl methane, 1,1-bis(p-hydroxyphenyl)cyclohexane, 4,4'-dihydroxybenzophenone, phloroglucinol, pyrogallol, 2,2',5,5'-tetrahydroxydiphenyl sulfone, tris(hydroxyphenyl)methane, dicyclopentadiene diphenol, tricyclopentadiene diphenol, terephthalic acid, isophthalic acid, p-hydroxybenzoic acid; mixtures thereof and the like.

The epoxy resins containing a mesogenic or rodlike moiety which can particularly be employed herein include, for example, those represented by the aforementioned Formulas II, V, VI or IX wherein at least 80 percent of the molecules are para substituted by both the bridging groups (—A—) and the substituent containing the glycidyl group(s)

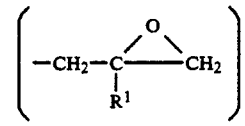

as well as the substituent containing the secondary hydroxy alkylidene group(s)

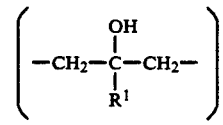

which are present when p or $p^1$ has a value greater than zero. For Formula VI, it is to be understood that para substitution is with respect to the direct bond between the aromatic rings.

The bridging groups (—A—) in the formulas for the epoxy resins containing mesogenic or rodlike moieties form a rigid central linkage between the aromatic ring pairs, that is, A is a direct single bond,
—C≡C—, —CR$^1$=N—, —N=N—, —O—CO—,
—NR$^1$—CO—, —CR$^1$=N—N=CR$^1$—, —CR$^1$=C-R$^1$—CO—, —CR$^1$=CR$^1$,
—N=CR$^1$—, —CO—O—, —CO—NR$^1$—,
—CO—CR$^1$=CR$^1$—, —CO—O—N=CR$^1$—,
—CR$^1$=N—O—OC—, —CO—NR$^1$—NR$^1$—OC—,
—CR$^1$=CR$^1$—O—OC—,
—CO—O—CR$^1$=CR$^1$—, —O—OC—CR$^1$=CR$^1$—,
—CR$^1$=CR$^1$—CO—O—,
—(CHR$^1$)$_n'$—O—CO—CR$^1$=CR$^1$—, —CR$^1$=C-R$^1$—CO—O—(CHR$^1$)$_n'$—,
—(CHR$^1$)$_n'$—CO—O—CR$^1$=CR$^1$—, —CR$^1$=C-R$^1$—O—CO—(CHR$^1$)$_n'$—,
—CO—S—, —S—OC—, —CH$_2$—CH$_2$—CO—O—,
—O—OC—CH$_2$—CH$_2$—,
—C≡C—C≡C—, —CR$^1$=CR$^1$—CR$^1$=CR$^1$—,

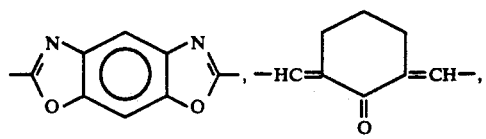

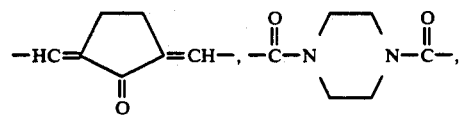

-continued

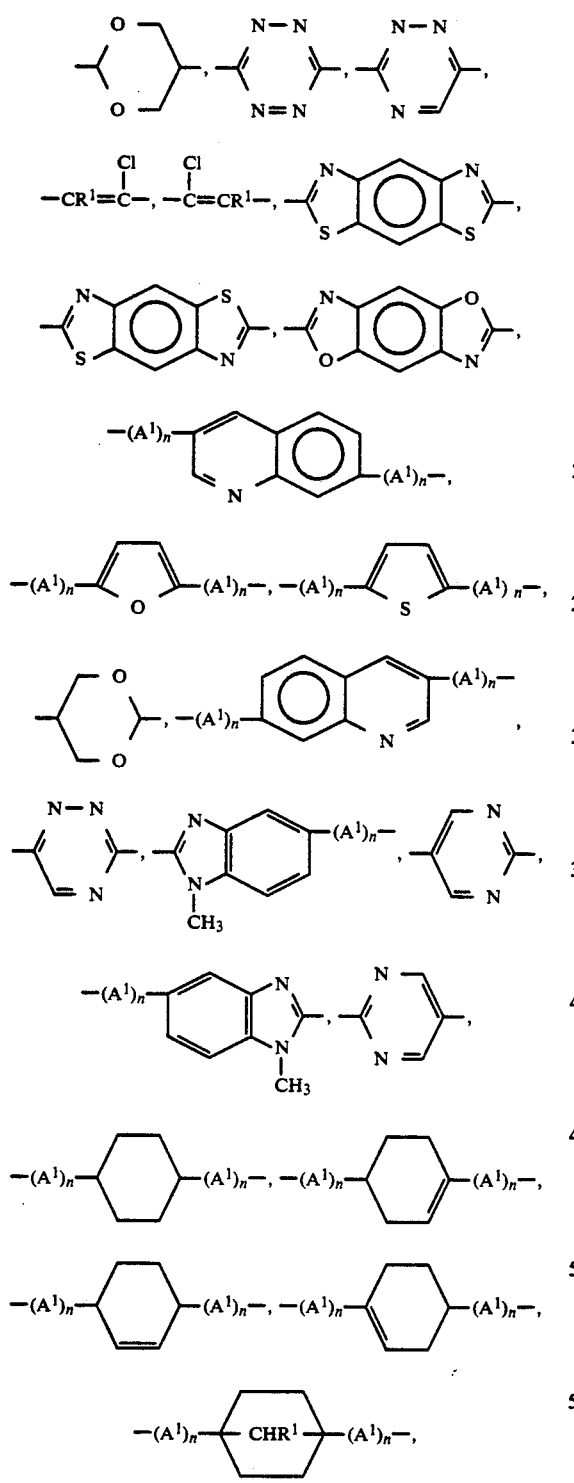

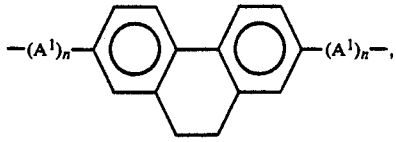

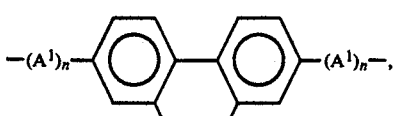

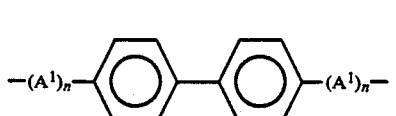

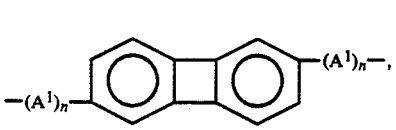

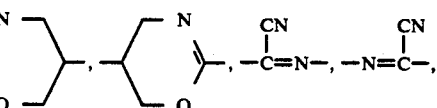

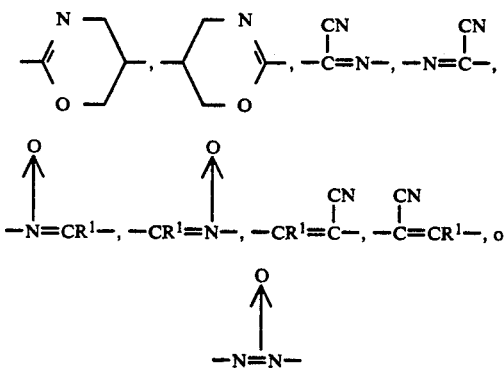

group and n, n; $A^1$ and $R^1$ are as hereinbefore described. To optimize the aspect ratio of said mesogenic or rodlike functionalities, it is preferred that the aromatic ring substituents (R in Formulas II, V, VI and IX) are hydrogen or methyl groups.

Representative polyepoxide compounds containing a mesogenic or rodlike moiety include, for example, the diglycidyl ethers of b 4,4'-dihydroxybiphenyl, 4,4'-dihydroxystilbene, 4,4'-dihydroxydiphenylacetylene, 4,4'-dihydroxydiphenylazomethine, 4,4'-dihydroxyazobenzene, 4,4'-dihydroxyazoxybenzene, 4,4'-bis((4-hydroxy)phenoxy)diphenyl, 4,4'-dihydroxy-alphamethylstilbene, 3,3',5,5'-tetramethyl-4,4'-dihydroxydiphenyl, 3,3',5,5'-tetrachloro-4,4'-dihydroxydiphenyl, 2,2',6,6'-tetramethyl-4,4'-dihydroxydiphenyl, 4,4'-dihydroxybenzanilide, 4,4'-dihydroxychalcone, 4,4'-dihydroxy-alpha-cyanostilbene, 4-hydroxyphenyl-4-hydroxybenzoate, 4,4'-dihydroxy-3,3',5,5'-tetrabromo-alpha-methylstilbene, N,N'-bis(4-hydroxyphenyl)-terephthalamide, the diglycidyl ethers of the dihydric phenols represented by the following formulas:

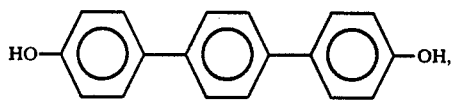

-continued
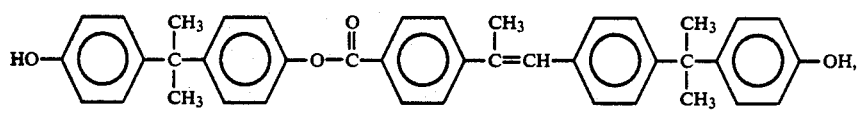
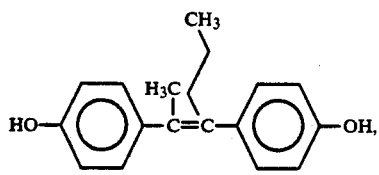
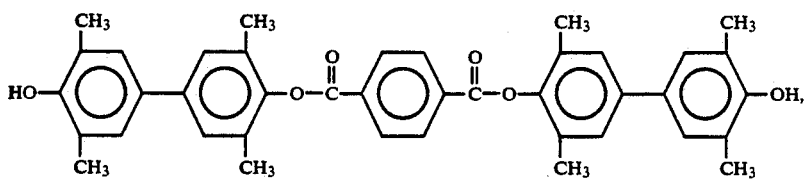
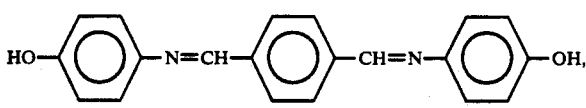
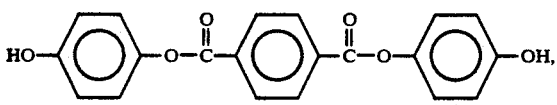
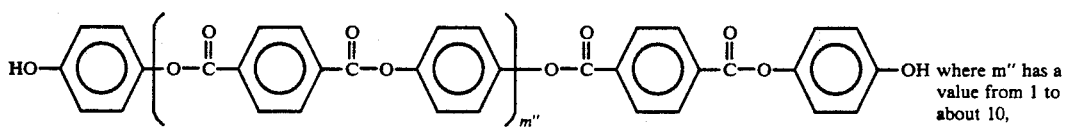
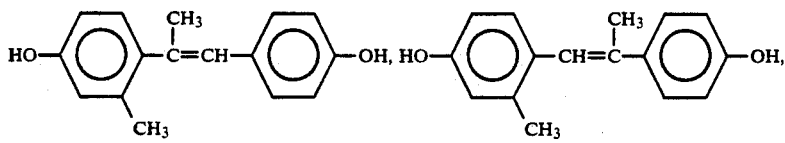
OH where m" has a value from 1 to about 10,
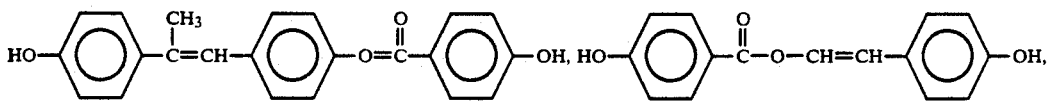
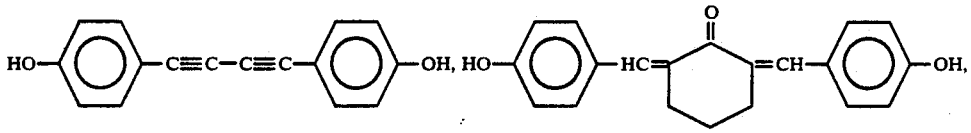
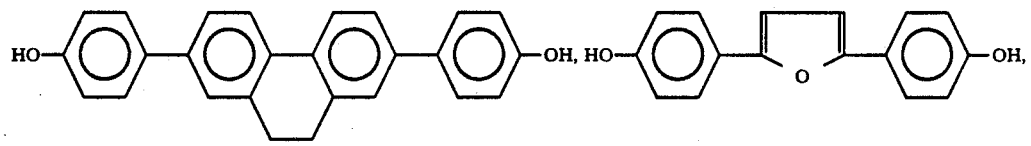
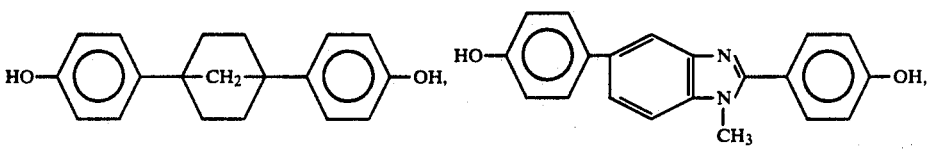

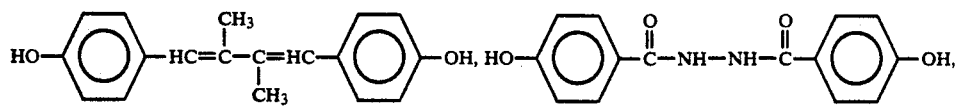
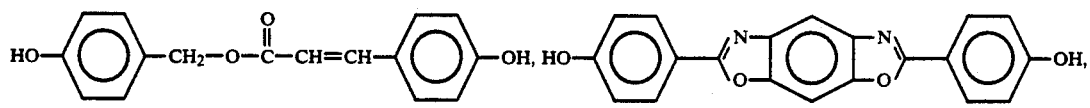
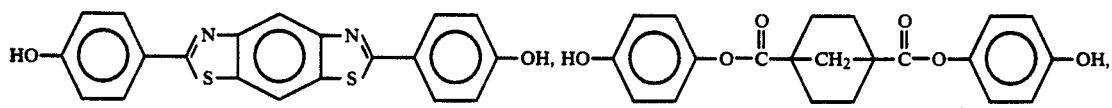
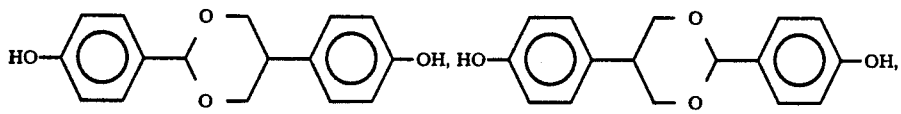
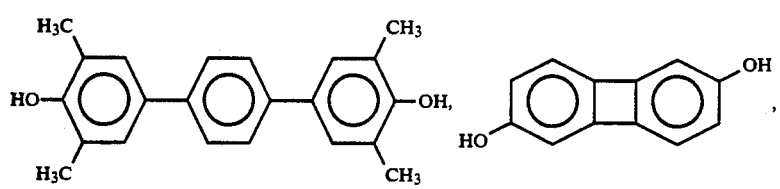
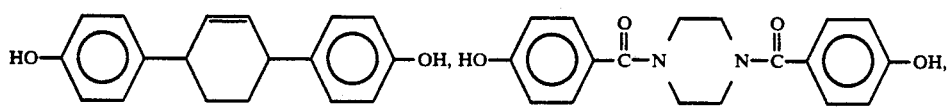
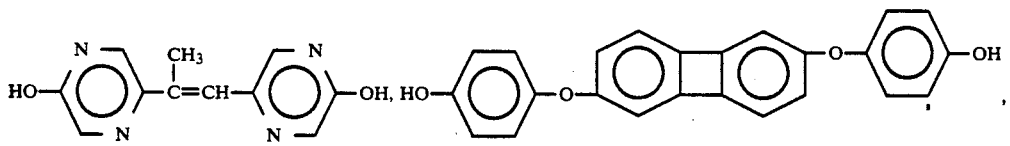
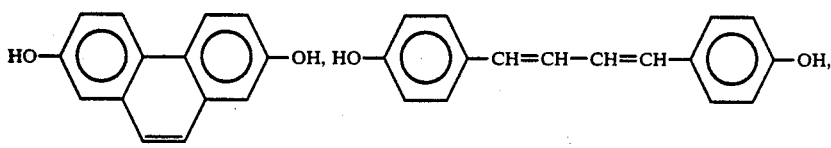
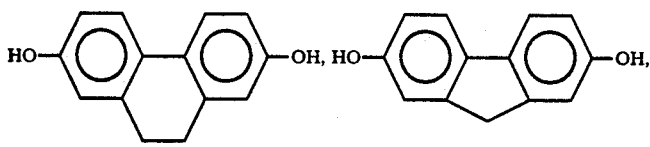
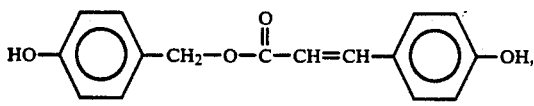
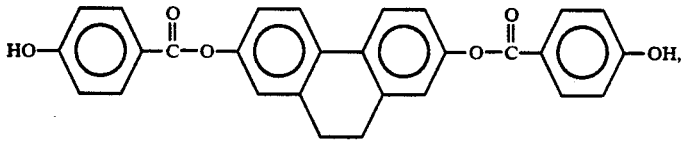
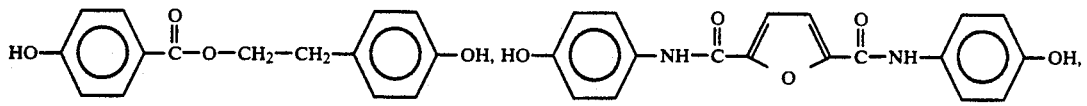

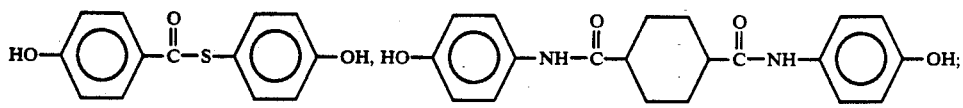

the tetraglycidyl amines of 4,4'-diamino-alpha-methylstilbene, 4,4'-diaminostilbene, 4,4'-diaminobenzanilide, 4,4'-diaminoazobenzene, 4,4'-diamino-alpha-cyanostilbene. Also suitable are the products resulting from advancing the aforementioned diglycidyl ethers with aromatic dihydroxyl or dicarboxylic acid containing compounds including, for example, all of the previously listed diphenol precursors to the diglycidyl ethers containing a mesogenic or rodlike moiety; mixtures thereof and the like.

The epoxy resins which can be employed herein can be prepared by reacting the corresponding di- or polyhydroxyl containing compound (or amine containing compound) with an epihalohydrin by any suitable means known to those skilled in the art. Suitable such methods are disclosed by Lee and Neville in *Handbook of Epoxy Resins*, McGraw-Hill, (1967); Japan Kokai Tokkyo Koho JP 62 86,484 (87 96, 484); EP 88-008358/92 and Journal of Applied Polymer Science, Vol. 23, 1355-1372 (1972) all of which are incorporated herein by reference.

Generally, the di- or polyhydroxyl containing compound is reacted with an epihalohydrin in the presence of a suitable catalyst and in the presence or absence of a suitable solvent at a temperature suitably from about 0° C. to about 100° C. more suitably from about 20° C. to about 80° C., most suitably from about 20° C. to about 65° C.; at pressures suitably from about 30 mm Hg vacuum to about 100 psia., more suitably from about 30 mm Hg vacuum to about 50 psia., most suitably from about atmospheric pressure to about 20 psia.; for a time sufficient to complete the reaction, usually from about 1 to about 12, more usually from about 1 to about 5, most usually from about 1 to about 3 hours; and using from about 1.5:1 to about 100:1, preferably from about 2:1 to about 50:1, most preferably from about 3:1 to about 20:1 moles of epihalohydrin per hydroxyl group. This initial reaction unless the catalyst is an alkali metal or alkaline earth metal hydroxide employed in stoichiometric quantities produces a halohydrin intermediate which is then reacted with a basic acting compound to convert the vicinal chlorohydrin groups to epoxide groups. The resultant product is a glycidyl ether compound.

Suitable epihalohydrins which can be employed to prepare the epoxy resins useful in the present invention include, for example, those represented by the following formula

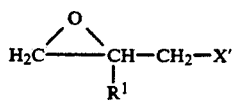

wherein $R^1$ is as previously defined; and X' is a halogen. Particularly suitable such epihalohydrins include, for example, epichlorohydrin, epibromohydrin, epiiodohydrin, methylepichlorohydrin, methylepibromohydrin, methylepiiodohydrin, combinations thereof and the like.

Suitable di- or polyhydroxyl containing compounds (or amine containing compounds) which can be employed to prepare the epoxy resins useful in the present invention include, for example, those represented by the formulas

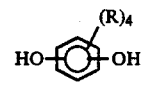 Formula XI.

 Formula XII.

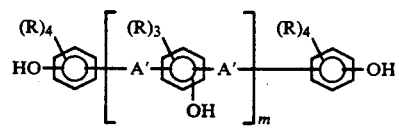 Formula XIII.

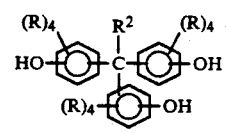 Formula XIV.

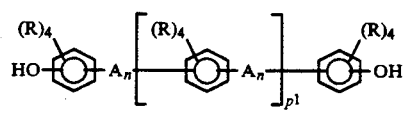 Formula XV.

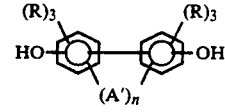 Formula XVI.

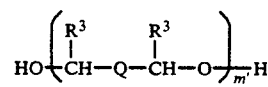 Formula XVII.

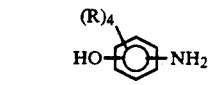 Formula XVIII.

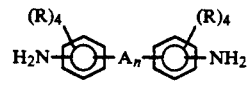 Formula XIX.

wherein R, $R^2$, $R^3$, Q, A, A', n, $p^1$, m and m' are as hereinbefore defined.

Suitable catalysts which can be employed to prepare the epoxy resins which can be employed herein include, for example, ammonium halides such as, for example, benzyltrimethylammonium chloride, benzyltrimethylammonium bromide, tetrabutylammonium chloride, tetrabutylammonium bromide, tetraoctylammonium chloride, tetraoctylammonium bromide, tetramethylammonium chloride, tetramethylammonium bromide, combinations thereof and the like.

Suitable basic acting compounds which can be employed to prepare the epoxy resins useful herein include, for example, alkali metal or alkaline earth metal hydroxides, carbonates, bicarbonates and the like. Particularly suitable such compounds include, for example, sodium hydroxide, potassium hydroxide, lithium hydroxide, calcium hydroxide, barium hydroxide, magnesium hydroxide, manganese hydroxide, sodium carbonate, potassium carbonate, lithium carbonate, calcium carbonate, barium carbonate, magnesium carbonate, manganese carbonate, sodium bicarbonate, potassium bicarbonate, lithium bicarbonate, calcium bicarbonate, barium bicarbonate, magnesium bicarbonate, manganese bicarbonate, mixtures, thereof and the like. Most preferred is sodium hydroxide or potassium hydroxide.

Suitable solvents which can be employed herein include, for example, alcohols, aliphatic hydrocarbons, aromatic hydrocarbons, glycol ethers, amides, sulfoxides, sulfones, combinations thereof and the like. Particularly suitable solvents include, for example, methanol, ethanol, isopropanol, hexane, heptane, octane, nonane, decane, toluene, xylene, ethylene glycol methyl ether, ethylene glycol ethyl ether, ethylene glycol n-butyl ether, ethylene glycol phenyl ether, propylene glycol methyl ether, propylene glycol phenyl ether, tripropylene glycol methyl ether, diethylene glycol methyl ether, diethylene glycol ethyl ether, diethylene glycol n-butyl ether, diethylene glycol phenyl ether, butylene glycol methyl ether, N,N-dimethylformamide, N-methylpyrrolidinone, N,N-dimethylacetamide, dimethylsulfoxide, sulfolane, combinations thereof and the like.

The solvent is usually employed in amounts suitably from about 5 to about 95, more suitably from about 20 to about 60, most suitably from about 30 to about 40, percent by weight based upon the combined weight of solvent and epihalohydrin.

For the production of epoxy resins from di- and polyhydroxyl containing compounds (or amine containing compounds) possessing functional groups or linkages that are sensitive to hydrolysis under the reaction conditions employed in certain of the epoxidation chemistries, alternate techniques of preparation may be employed. As a typical example, U. S. Pat. No. 4,762,901 teaches preparation of the diglycidyl ether of the biphenol represented by the following formula

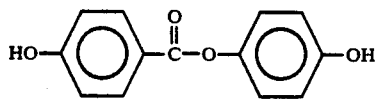

which is a compound containing an ester linkage known to be sensitive to hydrolysis, using an anhydrous epoxidation technique. This technique employs azeotropic removal of water/epichlorohydrin concurrent with the controlled addition of aqueous sodium hydroxide to a reaction mixture consisting of epichlorohydrin, a diphenol, a phase transfer catalyst such as, for example, benzyltrimethylammonium chloride, and optionally solvent(s). It is advantageous to conduct such anhydrous epoxidation reactions under a vacuum to facilitate the azeotropic removal of water. It is also operable and advantageous to utilize sodium hydroxide free of water as the alkali metal hydroxide reactant. In order to control reaction exotherm, the solid sodium hydroxide is typically added in aliquots as a powder to the epoxidation reaction mixture. A typical anhydrous epoxidation technique i3 described in U.S. Pat. No. 4,499,255 which is incorporated herein by reference in its entirety.

Another specific anhydrous epoxidation technique involves catalytic coupling of the di- or polyhydroxyl containing compound with an epihalohydrin, typically using as a catalyst one or more of the aforementioned ammonium halides. The resultant solution of halohydrin in excess epihalohydrin is then treated with finely pulverized potassium carbonate to effect dehydrohalogenation to the epoxy resin.

Advancement reaction of di- and polyglycidyl ethers can be performed by the known methods described in the aforementioned *Handbook of Epoxy Resins*. This usually includes combining one or more suitable compounds having an average of more than one active hydrogen atom per molecule, including, for example, dihydroxy aromatic, dithiol or dicarboxylic acid compounds or compounds containing one primary amine or amide group or two secondary amine groups and the di- or polyglycidyl ethers With the application of heat and mixing to effect the advancement reaction. A catalyst is frequently added to facilitate the advancement reaction.

The advancement of the epoxy resins containing one or more mesogenic or rodlike moieties with compounds having an average of more than one active hydrogen per molecule is employed to linearly chain extend the resin so as to produce an advanced epoxy resin. This linear chain extension is required for some mesogenic containing resin compositions in order to obtain liquid crystal character. The advancement of the mesogenic or rodlike epoxy resins can also be used to increase the temperature range in which a particular resin is liquid crystalline and to control the degree of crosslinking during the final curing stage.

The epoxy resin containing one c)r more mesogenic or rodlike moieties and the compound having an average of more than one active hydrogen atom per molecule are reacted in amounts which provide suitably from about 0.01:1 to about 0.99:1, more suitably from about 0.05:1 to about 0.9:1, most suitably from about 0.10:1 to about 0.50:1 active hydrogen atoms per epoxy group.

Particularly suitable compounds having an average of more than one active hydrogen atom per molecule which can be employed herein in the preparation of the advanced epoxy resins include hydroxyl-containing compounds, carboxylic acid-containing compounds and primary amine-containing compounds.

Particularly suitable hydroxyl-containing compounds include, for example, hydroquinone, bisphenol A, 4,4'-dihydroxydiphenylmethane, 4,4'-thiodiphenol, 4,4'-sulfonyldiphenol, 4,4'-dihydroxydiphenyl oxide, 4,4'-dihydroxybenzophenone, 1,1-bis(4-hydroxyphenyl)-1-phenylethane, 3,3',5,5'-tetrachlorobisphenol A, 3,3'-dimethoxybisphenol A, 4,4'-dihydroxybiphenyl, 4,4'-dihydroxy-α,α'-diethylstilbene, 4,4'-dihydroxy-α-methylstilbene, 4,4'-dihydroxybenzanilide, 4,4'-dihydroxy-2,2'-dimethylazoxybenzene, 4,4'-dihydroxy-α-cyanostilbene, bis(4-hydroxyphenyl)terephthalate, bis(N,N'-4-hydroxyphenyl)terephthalamide, bis(4'-hydroxybiphenyl)terephthalate, 4,4'-dihydroxyphenylbenzoate, bis(4'-hydroxyphenyl)-1,4-benzenediimine, 4,4''-dihydroxybiphenylbenzoate, 1,4-bis(4'-hydroxyphenyl-1'-carboxamide)benzene, 1,4-bis(4'-hydroxyphenyl-1'-carboxy)benzene, 4,4'-bis(4''-hydroxyphenyl-1''-carboxy)biphenyl, mixtures thereof and the like.

Particularly suitable carboxylic acid-containing compounds include, for example, terephthalic acid, 4,4'-benzanilide dicarboxylic acid, 4,4'-phenylbenzoate dicarboxylic acid, 4,4'-stilbenedicarboxylic acid and mixtures thereof and the like.

Particularly suitable primary amine-containing compounds include, for example, aniline, 4'-sulfonamido-N-phenyl benzamide, 4'-sulfonamido-N'-phenyl-4-chlorobenzamide, 4-amino-l-phenylbenzoate, 4-amino-N-phenylbenzamide, N-phenyl-4-amino-phenyl-1-carboxamide, phenyl-4-aminobenzoate, biphenyl-4-aminobenzoate, 1-phenyl-4'-aminophenylterephthalate, mixtures thereof and the like.

The advancement reaction can be conducted in the presence of a suitable advancement catalyst such as, for example, phosphines, quaternary ammonium compounds, phosphonium compounds, tertiary amines and the like. Particularly suitable catalysts include, for example, ethyltriphenylphosphonium chloride, ethyltriphenylphosphonium bromide, ethyltriphenylphosphonium iodide, ethyltriphenylphosphonium diacetate (ethyltriphenylphosphonium acetate.acetic acid complex), ethyltriphenylphosphonium phosphate, tetrabutylphosphonium chloride, tetrabutylphosphonium bromide, tetrabutylphosphonium iodide, tetrabutylphosphonium diacetate (tetrabutylphosphonium acetate.acetic acid complex), butyltriphenylphosphonium tetrabromobisphenate, butyltriphenylphosphonium bisphenate, butyltriphenyl phosphonium bicarbonate, benzyltrimethylammonium chloride, tetramethylammonium hydroxide, triethylamine, tripropylamine, tributylamine, 2-methylimidazole, benzyldimethylamine, mixtures thereof and the like. Many of these catalysts are described in U.S. Pat. Nos. 3,306,872; 3,341,580; 3,379,684; 3,477,990; 3,547,881; 3,637,590; 3,843,605; 3,948,855; 3,956,237; 4,048,141; 4,093,650; 4,131,633; 4,132,706; 4,171,420; 4,177,216; and 4,366,295, all of which are incorporated herein by reference.

The amount of advancement catalyst depends, of course, upon the particular reactants and catalyst employed; however, it is usually employed in quantities of from about 0.03 to about 3, preferably from about 0.03 to about 1.5, most preferably from about 0.05 to about 1.5 percent by weight based upon the weight of the epoxy containing compound.

The advancement reaction can be conducted at atmospheric, superatmospheric or subatmospheric pressures at temperatures of from about 20° C. to about 260° C., preferably from about 80° C. to about 240° C., more preferably from about 100° C. to about 200° C. The time required to complete the advancement reaction depends upon the temperature employed. Higher temperatures require shorter periods of time whereas lower temperatures require longer periods of time. Generally, however, times of from about 5 minutes to about 24 hours, preferably from about 30 minutes to about 8 hours, more preferably from about 30 minutes to about 3 hours are suitable.

If desired, the advancement reaction can be conducted in the presence of one or more solvents. For the production of advanced epoxy resins using a reactant which is of low solubility in the di- or polyclycidyl ether reactant, it is frequently of advantage to add one or more solvents to the reaction mixture. Suitable such solvents include, for example, glycol ethers, aliphatic and aromatic hydrocarbons, aliphatic ethers, cyclic ethers, ketones, esters, amides, combinations thereof and the like. Particularly suitable solvents include, for example, toluene, benzene, xylene, methyl ethyl ketone, methyl isobutyl ketone, diethylene glycol methyl ether, dipropylene glycol methyl ether, dimethylformamide, dimethylsulfoxide, N-methypyrrolidinone, tetrahydrofuran, propylene glycol methyl ether, combinations thereof and the like. The solvents can be employed in amounts of from about zero to about 80%, preferably from about 20% to about 60%, more preferably from about 30% to about 50% by weight based upon the weight of the reaction mixture. Care should be taken to utilize only those solvents which are inert to reaction with any of the reactants employed in the advancement reaction or the product formed therefrom.

ACTIVE HYDROGEN CONTAINING COMPONENT

Materials containing two or more active hydrogens which are reactive with an epoxide group useful in the preparation of the epoxy resin adducts containing one or more mesogenic or rodlike moieties of the present invention include the di- and polyphenols, such as, for example, those represented by formulas XI, XII, XIII, XIV, XV and XVI; the di- and polycarboxylic acids, such as, for example, those represented by formulas XX, XXI, XXIII, XXIV, XXV and XXVI where each Y is a —COOH group; the di- and polymercaptans, such as, for example, those represented by formulas XX, XXI, XXIII, XXIV, XXV and XXVI where each Y is a —SH group; the di- and polyamines, such as, for example, those represented by formulas XX, XXI, XXII, XXIII, XXIV, XXV and XXVI where each Y is a —NHR$^1$ group, as well as formula XXVI where one Y is a —NHR$^1$ group and the other Y is a

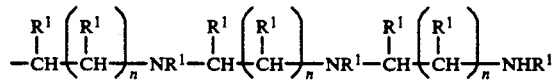

group; the primary monoamines, such as, for example, those represented by formulas XX, XXI, XXIV, XXV and XXVI where one Y is a —NH$_2$ group and the other Y is a hydrogen, as well as formula XXIII where one Y is a —NH$_2$ group and the remaining other Y's are hydrogen; the sulfonamides, such as, for example, those represented by formulas XX, XXI, XXIV, XXV and XXVI where one Y is a —SO$_2$—NH$_2$ group and the other Y is a hydrogen, as well as formula XXIII where one Y is a —SO$_2$—NH$_2$ group and the remaining other Y's are hydrogen; the aminophenols, such as, for example, those represented by formulas XX, XXI, XXIV and XXV where one Y is a —NHR$^1$ group and the other Y is a —OH group, as well as formula XXIII where one or two Y's are —NHR$^1$ groups and the remaining one or two Y's are —OH groups, the amino carboxylic acids, such as, for example, those represented by formulas XX, XXI, XXIV, XXV and XXVI where one Y is a —NHR$^1$ group and the other Y is a —COOH group, as well as formula XXIII where one or two Y's are —NHR$^1$ groups and the remaining one or two Y's are —COOH groups; the phenolic hydroxyl containing carboxylic acids, such as, for example, those represented by formulas XX, XXI, XXIV and XXV where one Y is a —OH group and the other Y is a —COOH group, as well as formula XXIII where one or two Y's are —OH groups and the remaining one or two Y's are —COOH groups; the sulfanilamides, such as, for example, those represented by formulas XX, XXI, XXIV and XXV where one Y is a —NHR$^1$ group and the other Y is a —SO$_2$—NH$_2$ group, as well as formula XXIII where one or two Y's are —NHR$^1$ groups and the remaining one or two Y's are —SO$_2$—NH$_2$ groups;

wherein R, R¹, R², A, A', n, p¹ and m are as hereinbefore defined and X² is a divalent hydrocarbyl group having from one to about 60 carbon atoms and may be linear or branched aliphatic, cycloaliphatic or polycycloaliphatic and may contain one or more linkages selected from ether (—O—), thioether (—S—),

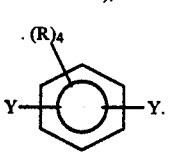

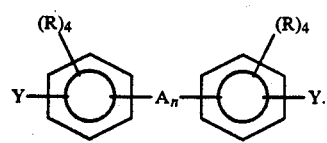

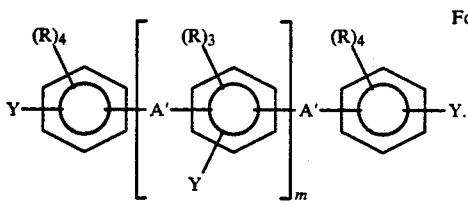

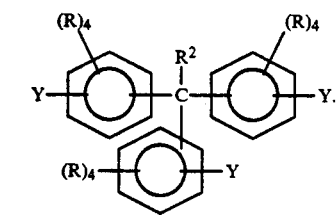 Formula XX

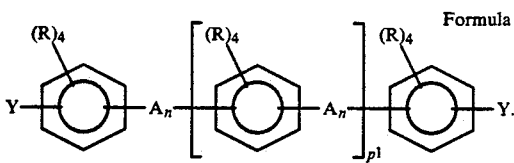 Formula XXI

Formula XXII

Formula XXIII

Formula XXIV

Formula XXV

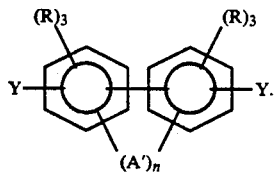

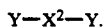 Formula XXVI

Representative of the di- and polyphenol compounds which are free of mesogenic or rodlike moieties include, for example, resorcinol, hydroquinone, bisphenol A, 4,4'-dihydroxydiphenylmethane, 3,3',5,5'-tetrabromobisphenol, A, 4,4'-thiodiphenol, 4,4'-sulfonyldiphenol, 4,4'-dihydroxydiphenyl oxide, 4,4'-bis(4-(4-hydroxyphenoxy)phenylsulfone)diphenyl ether, 1,1-bis(4-hydroxyphenyl)cyclohexane, tris(hydroxyphenyl)methane, phenol or substituted phenol-aldehyde condensation products (novolacs), dicyclopentadiene or an oligomer thereof and phenol or substituted phenol condensation products, mixtures thereof and the like.

Representative of the di- and polyphenol compounds containing one or more mesogenic or rodlike moieties include, for example, 4,4'-dihydroxybiphenyl, 4,4'-dihydroxystilbene, 4,4'-dihydroxydiphenylacetylene, 4,4'-dihydroxydiphenylazomethine, 4,4'-dihydroxyazobenzene, 4,4'-dihydroxyazoxybenzene, 4,4'-bis(4-hydroxyphenoxy)diphenyl, 4,4'-dihydroxy-alpha-methylstilbene, 3,3',5,5'-tetramethyl-4,4'-dihydroxydiphenyl, 3,3',5,5'-tetrachloro-4,4'-dihydroxydiphenyl, 2,2',6,6'-tetramethyl-4,4'-dihydroxydiphenyl, 4,4'-dihydroxybenzanilide, 4,4'-dihydroxychalcone, 4,4'-dihydroxyalpha-cyanostilbene, 4-hydroxyphenyl-4-hydroxybenzoate, 4,4'-dihydroxy-3,3',5,5'-tetrabromo-alpha-methylstilbene, 4,4'-bis(4-(4-hydroxyphenoxy)phenylsulfone)-stilbene, 1,4-bis(4-hydroxyphenyl)-trans-cyclohexane, N,N'-bis(4-hydroxyphenyl)terephthalamide, mixtures thereof and the like.

Representative of the di- and polycarboxylic acid compounds which are free of mesogenic or rodlike moieties include, for example, 4,4'-dicarboxydiphenylmethane, 4,4'-isopropylidenedicarboxylic acid, 3,3',5,5'-tetrabromo-4,4'-isopropylidenedicarboxylic acid, terephthalic acid, isophthalic acid, 1,4-cyclohexanedicarboxylic acid, 1,6-hexanedicarboxylic acid, dicyclopentadienedicarboxylic acid, tris(carboxyphenyl)methane, 4,4'-bis(4-(4-carboxyphenoxy)phenyisulfone)diphenyl ether, 1,1-bis(4-carboxyphenyl)cyclohexane, mixtures thereof and the like.

Representative of the di- and polycarboxylic acid compounds containing one or more mesogenic or rodlike moieties include, for example, 4,4'-dicarboxydiphenyl, 4,4'-dicarboxystilbene, 4,4'-dicarboxydiphenylacetylene, 4,4'-dicarboxyazobenzene, 4,4'-bis(4-carboxyphenoxy)diphenyl, 4,4'-dicarboxy-alpha-methylstilbene, 3,3',5,5'-tetramethyl-4,4'-dicarboxydiphenyl, 3,3',5,5'-tetrachloro-4,4'-dicarboxydiphenyl, 2,2',6,6'-tetramethyl-4,4'-dicarboxydiphenyl, 4,4'-dicarboxybenzanilide, 4,4'-dicarboxy-alpha-cyanostilbene, 4,4'-dicarboxy-3,3',5,5'-tetrabromo-alpha-methylstilbene, N,N'-bis(4-carboxyphenyl)terephthalamide, 4,4'-bis(4-(4-carboxyphenoxy)phenylsulfone)stilbene, 1,4-bis(4-carboxyphenyl)-trans-cyclohexane, mixtures thereof and the like.

Representative of the di- and polymercaptan compounds which are free of mesogenic or rodlike moieties include, for example, 1,4-benzenedithiol, 1,3-benzenedithiol, 4,4'-isopropylidenedithiol, 1,4-cyclohexanedithiol, 1,6-hexanedithiol, 2,2'-dimercaptodiethylether, 1,2-dimercaptopropane, 1,3-dimercaptopropanol-2, bis(2-mercaptoethylsulfide), tris(mercaptophenyl)methane, 4,4'-bis(4-(4-mercaptophenoxy)phenylsulfone)-diphenyl ether, 1,1-bis(4-mercaptophenyl)cyclohexane, mixtures thereof and the like.

Representative of the di- and polymercaptan compounds containing one or more mesogenic or rodlike moieties include, for example, 4,4'-dimercaptodiethyl, 4,4'-dimercaptostilbene, 4,4'-dimercaptodiphenylacetylene, 4,4'-dimercaptodiphenylazomethine, 4,4'-dimercaptoazobenzene, 4,4'-bis(4-mercaptophenoxy)-diphenyl, 4,4'-dimercapto-alpha-methylstilbene, 3,3',5,5'-tetramethyl-4,4'-dimercaptodiethyl, 3,3'5,5'-tetrachloro-4,4'-dimercaptodiphenyl, 2,2'6,6'-tetramethyl-4,4'-dimercaptodiphenyl, 4,4'-dimercaptobenzanilide, 4,4'- dimercaptochalcone, 4,4'-dimercaptoalpha-cyanostilbene, 4,4'-mercaptophenyl-4-mercaptobenzoate, 4,4'-dimercapto-3,3',5,5'-tetrabromo-alphamethylstilbene, N,N'-bis(4-mercaptophenyl)terephthalamide, 1,4-bis(4-mercaptophenyl)-transcyclohexane, 4,4'-bis(4-(4-mercaptophenoxy)phenylsulfone)stilbene, mixtures thereof and the like.

Representative of the di- and polyamine compounds which are free of mesogenic or rodlike moieties include, for example, 1,2-diaminobenzene, 1,3-diaminobenzene, 1,4-diaminobenzene, 4,4'-diaminodiphenylmethane, 3,3',5,5'-tetrabromo-4,4'-isopropylidenediamine, 4,4'-diaminodiphenyl oxide, 4,4'-diaminodiphenyl sulfone, 4,4'-diaminodiphenyl sulfide, aniline-aldehyde condensation products, tris(aminophenyl)methane, 1,4-cyclohexanediamine, 1,6-hexanediamine, piperazine, ethylenediamine, diethylenetriamine, triethylenetetraamine, aminoethylpiperazine, bis(aminopropyl)ether, bis(aminopropylsulfide), bis(aminomethyl)norbornane, 2,2'-bis(4-aminocyclohexyl)propane, 1,1-bis(4-aminophenyl)cyclohexane, 4,4'-bis(4-(4-aminophenoxy)-phenylsulfone)diphenyl ether, aminoethylpiperazine mixtures thereof and the like.

Representative of the di- and polyamine compounds containing one or more mesogenic or rodlike moieties include, for example, 3,3'-dimethyl-4,4'-diaminobiphenyl, 4,4'-diaminostilbene, 4,4'-diaminodiphenylacetylene, 4,4'-diaminodiphenylazomethine, 4,4'-diaminoazobenzene, 4,4'-diaminoazoxybenzene, 4,4'-bis(4-aminophenoxy)diphenyl, 4,4'-diamino-alphamethylstilbene, 3,3',5,5'-tetramethyl-4,4'-diaminodiphenyl, 3,3'5,5'-tetrachloro-4,4'-diaminodiphenyl, 2,2',6,6'-tetramethyl-4,4'-diaminodiphenyl, 4,4'-diaminobenzanilide, 4,4'-diaminochalcone, 4,4'-diamino-alpha-cyanostilbene, 4-aminophenyl-4-aminobenzoate, 4,4'-diamino-3,3',5,5'-tetrabromo-alpha-methylstilbene, N,N'-bis(4-aminophenyl)terephthalamide, 1,4-bis(4-aminophenyl)-transcyclohexane, 4,4'-bis(4-(4-aminophenoxy)phenylsulfone)stilbene, mixtures thereof and the like.

Representative of the primary monoamine compounds which are free of mesogenic or rodlike moieties include, for example, aniline, 4-methoxyaniline, 4-chloroaniline, 4-methylaniline, 4-cyanoaniline, 2,6-dimethylaniline, 4-aminodiphenyl oxide, 4-aminodiphenylmethane, 4-aminodiphenylsulfone, 4-aminodiphenylsulfide, methylamine, 4-aminobenzophenone, n-hexylamine, cyclohexylamine, aminonorbornane, mixtures thereof and the like. Ammonia represents a special case of the primary monoamines useful herein and may be conveniently used as the aqueous ammonium hydroxide solution.

Representative of the primary monoamine compounds containing one or more mesogenic or rodlike moieties include, for example, 4-aminodiphenyl, 4-aminostilbene, 4-amino-4'-methoxystilbene, 4-amino-4'-methylstilbene, 4-amino-4'-chlorostilbene, 4-amino-4'-nitrostilbene, 4-amino-4'-cyanostilbene, 4-aminodiphenylacetylene, 4-aminodiphenylazomethine, 4-aminoazobenzene, 4-aminoazoxybenzene, 4-amino-alphamethylstilbene, 4-aminobenzanilide, 4-aminochalcone, 4-amino-alpha-cyanostilbene, 4-aminophenyl-4-methoxybenzoate, 4-amino-2,2'6,6'-tetramethyl-alphamethylstilbene, 4-amino-2,6-dimethyl-alphamethylstilbene, mixtures thereof and the like.

Representative of the sulfonamide compounds which are free of mesogenic or rodlike moieties include, for example, phenylsulfonamide, 4-methoxyphenylsulfonamide, 4-chlorophenylsulfonamide, 4-methylphenylsulfonamide, 4-cyanophenylsulfonamide, 2,6-dimethylphenylsulfonamide, 4-sulfonamidodiphenyl oxide, 4-sulfonamidodiphenylmethane, 4-sulfonamidodiphenylsulfone, 4-sulfonamidobenzophenone, mixtures thereof and the like.

Representative of the sulfonamide compounds containing one or more mesogenic or rodlike moieties include, for example, 4-sulfonamidodiphenyl, 4-sulfonamidostilbene, 4-sulfonamido-4'-methoxystilbene, 4-sulfonamido-4'-methylstilbene, 4-sulfonamido-4'-chlorostilbene, 4-sulfonamido-4'-nitrostilbene, 4-sulfonamido-4'-cyanostilbene, 4-sulfonamidodiphenylacetylene, 4-sulfonamidodiphenylazomethine, 4-sulfonamidoazobenzene, 4-sulfonamidoazoxybenzene, 4-sulfonamido-alphamethylstilbene, 4-sulfonamidobenzanilide, 4-sulfonamidochalcone, 4-sulfonamido-alpha-cyanostilbene, 4-sulfonamidophenyl-4-methoxybenzoate, 4-sulfonamido-2,2',6,6'-tetramethyl-alpha-methylstilbene, 4-sulfonamido-2,6-dimethyl-alpha-methylstilbene, mixtures thereof and the like.

Representative of the aminophenol compounds which are free of mesogenic or rodlike moieties include, for example, o-aminophenol, m-aminophenol, p-aminophenol, 2-methoxy-4-hydroxy-l-aminobenzene, 3,5-dimethyl-4-hydroxy-l-aminobenzene, 3-cyclohexyl-4-hydroxy-1-aminobenzene, 2,6-dibromo-4-hydroxy-1-aminobenzene, 5-butyl-5-hydroxyaminobenzene, 3-phenyl-4-hydroxy-1-aminobenzene, 4-(1-(3-aminophenyl)-1-methylethyl)phenol, 4-(1-(4-aminophenyl)ethyl)phenol, 4-(4-aminophenoxy)phenol, 4-((4-aminophenyl)thio)phenol, (4-aminophenyl)(4-hydroxyphenyl)methanone, 4-((4-aminophenyl)sulfonyl)phenol, 4-(1-(4-amino-3,5-dibromophenyl)-1-methylethyl)-2,6-dibromophenol, N-methyl-p-aminophenol, mixtures thereof and the like.

Representative of the aminophenol compounds containing one or more mesogenic or rodlike moieties include, for example,

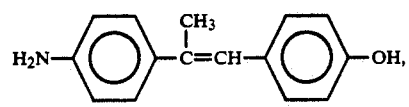

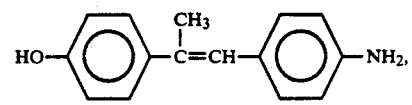

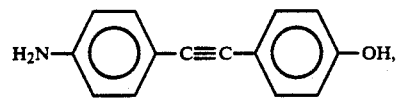

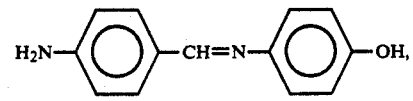

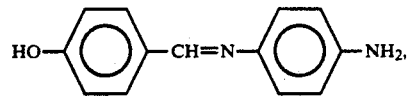

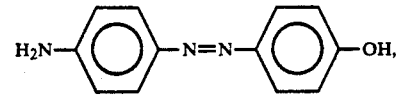

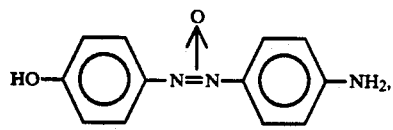
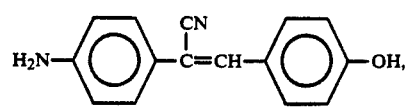
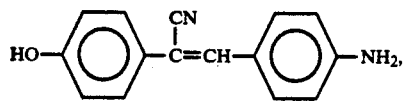
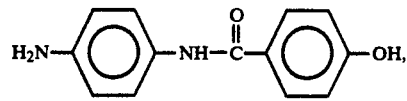
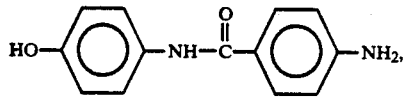
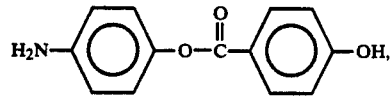
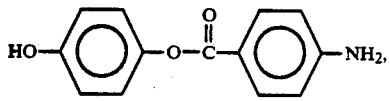
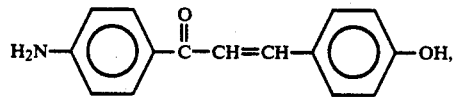
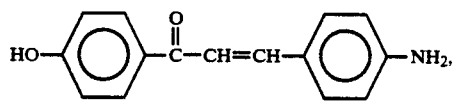
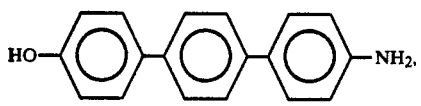
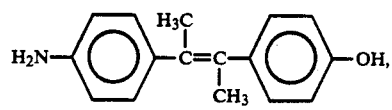
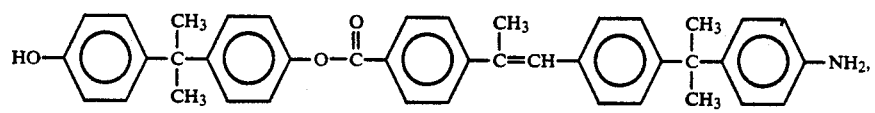
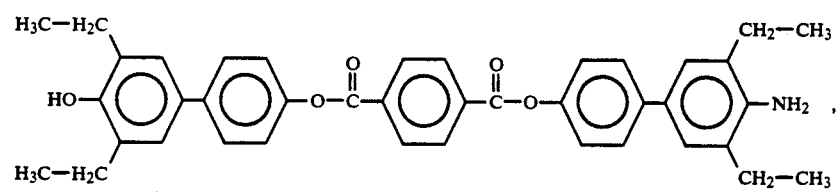
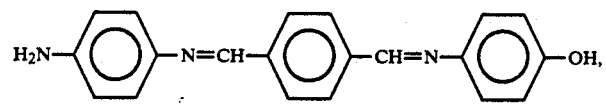
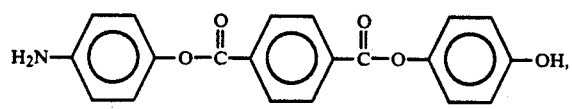
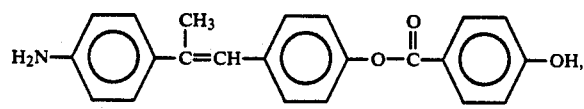
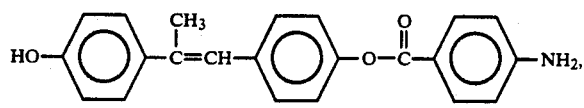

-continued
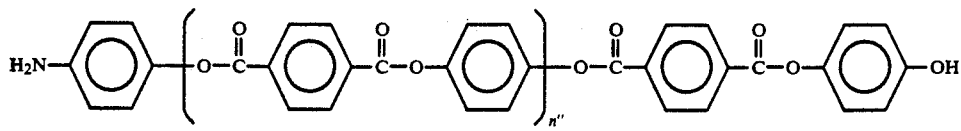
wherein n" has an average value from about 1 to about 10,
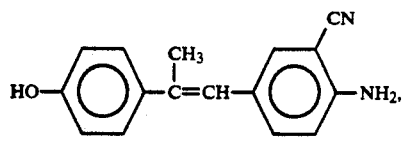 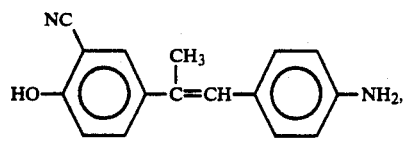
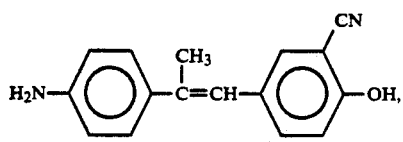 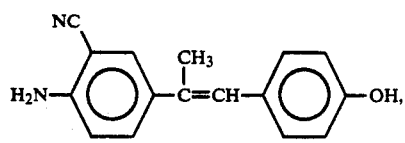
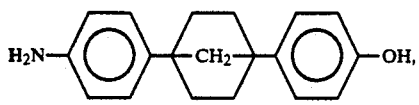 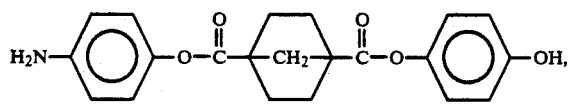
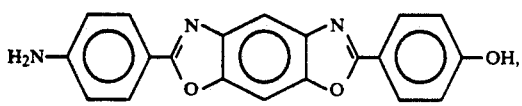 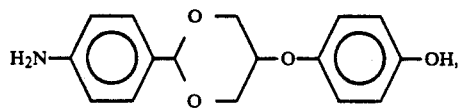
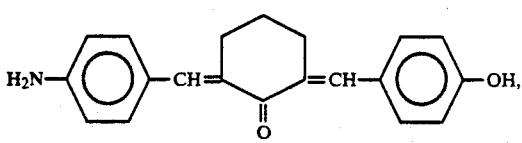 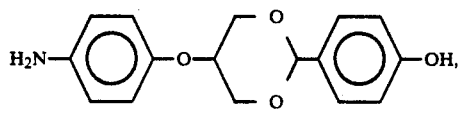
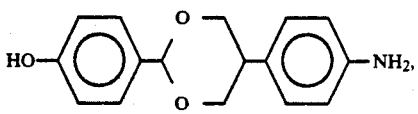 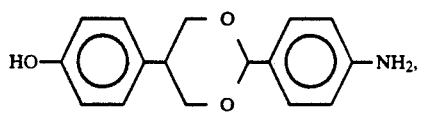
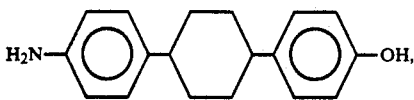 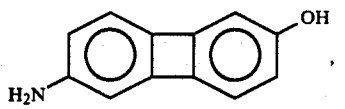
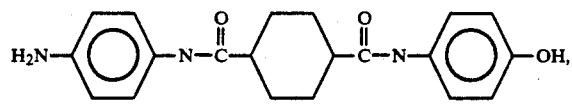
 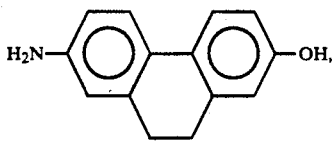

-continued

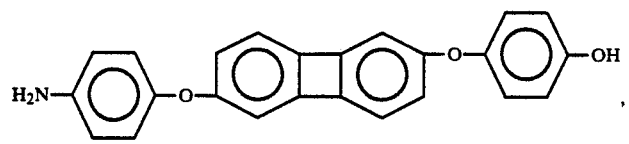

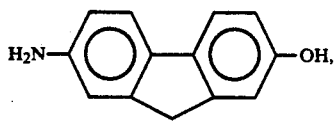

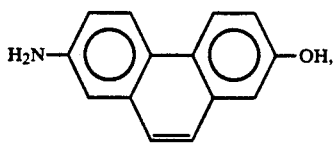

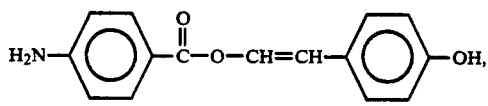

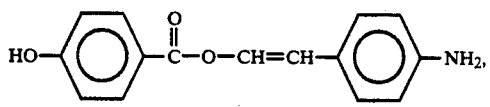
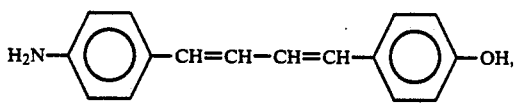

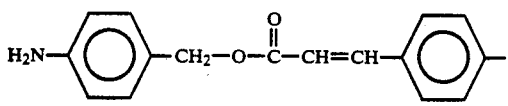
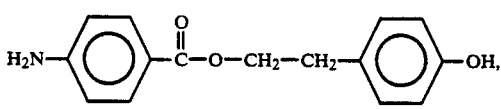

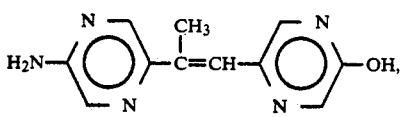
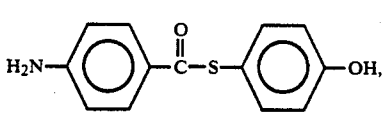

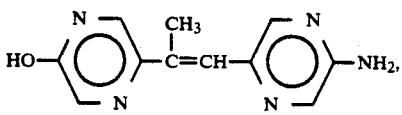
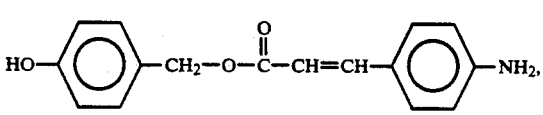

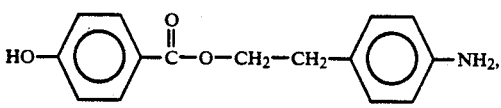
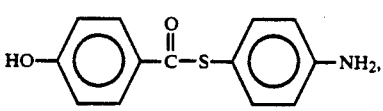

mixtures thereof and the like.

Representative of the aminocarboxylic acid compounds which are free of mesogenic or rodlike moieties include, for example, 2-aminobenzoic acid, 3-aminobenzoic acid, 4-aminobenzoic acid, 2-methoxy-4-aminobenzoic acid, 3,5-dimethyl-4-aminobenzoic acid, 3-cyclohexyl-4-aminobenzoic acid, 2,6-dibromo-4-aminobenzoic acid, 5-butyl-4-aminobenzoic acid, 3-phenyl-4-aminobenzoic acid, 4-(1-(3-aminophenyl)-1-methylethyl)benzoic acid, 4-(1-(4-aminophenyl)ethyl)-benzoic acid, 4-(4-aminophenoxy)benzoic acid, 4-((4-aminophenyl)thio)-benzoic acid, (4-aminophenyl)(4-carboxyphenyl)methanone, 4-((4-aminophenyl)sulfonyl)benzoic acid, 4-(I-(4-amino-3,5-dibromophenyl)-1-methylethyl)-2,6-dibromobenzoic acid, glycine, N-methylglycine, 4-aminocyclohexanecarboxylic carboxylic acid, 4-aminohexanoic acid, 4-piperidinecarboxylic acid, mixtures thereof and the like.

Representative of the aminocarboxylic acid compounds containing one or more mesogenic or rodlike moieties include, for example,

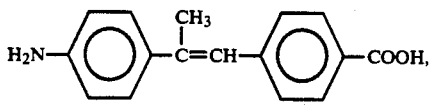
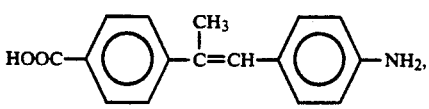

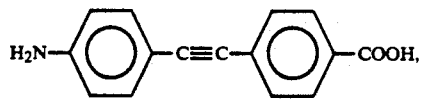
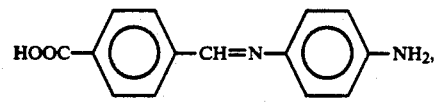
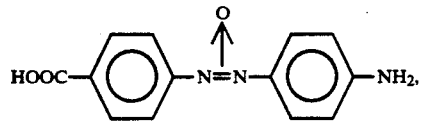
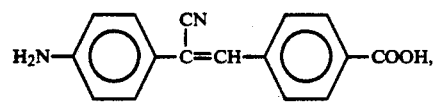
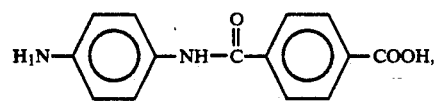
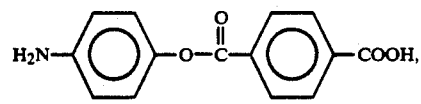
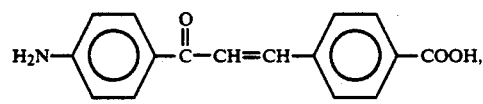
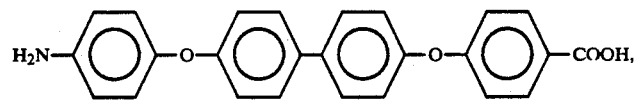
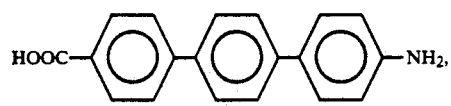
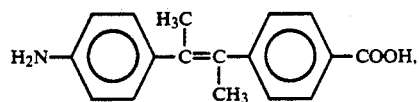
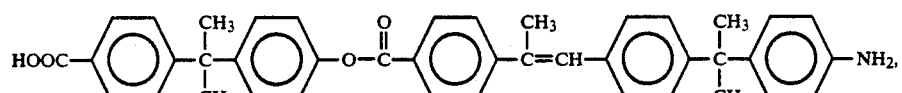
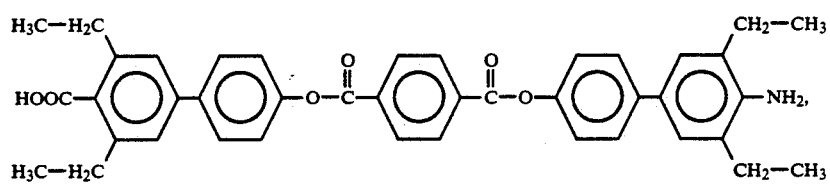
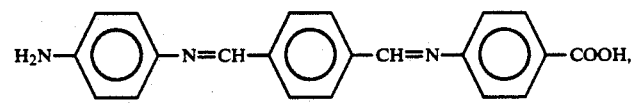
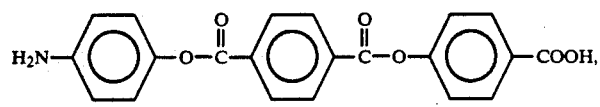

-continued
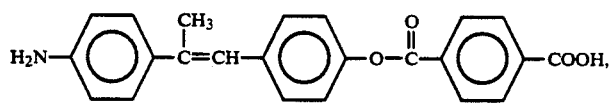
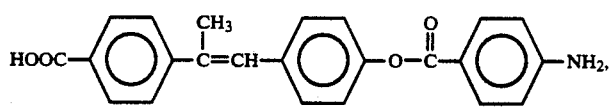
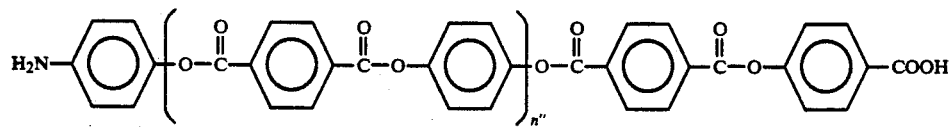
wherein n" has a value from 1 to about 10,
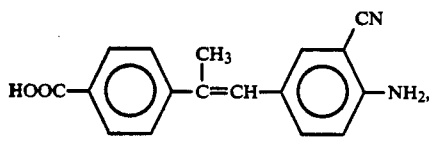
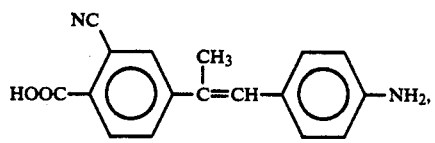
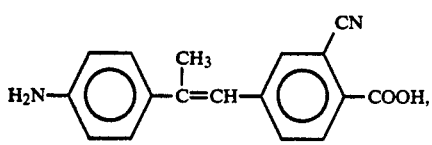
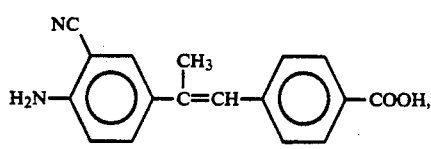
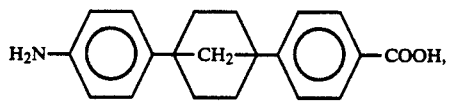
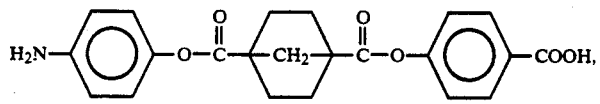
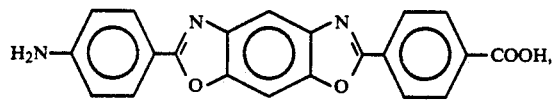
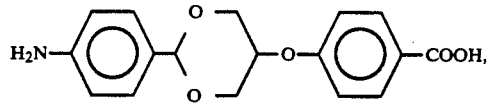
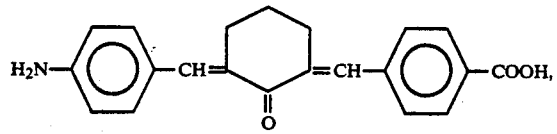
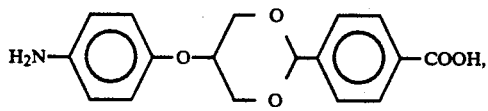
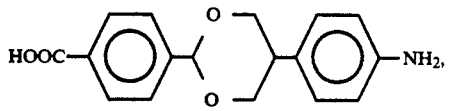
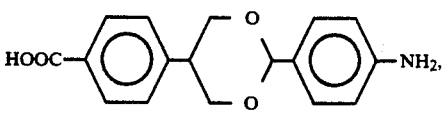

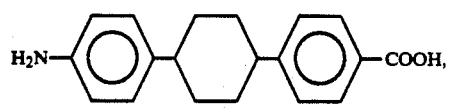
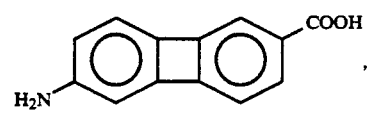
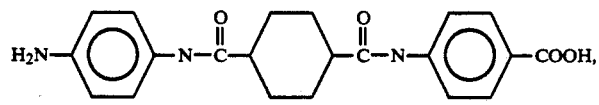
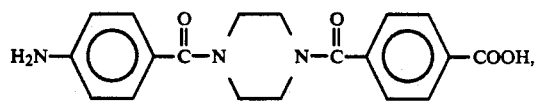
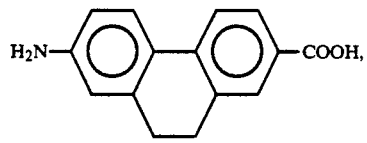
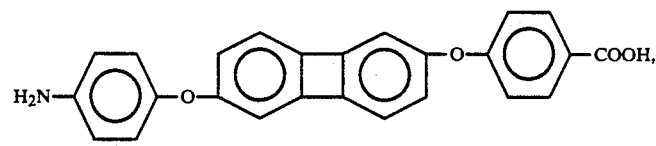
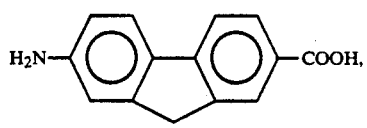
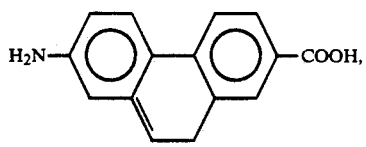
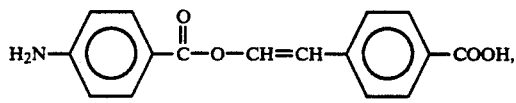
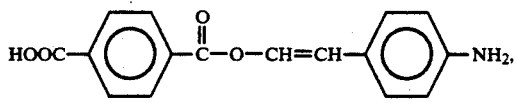
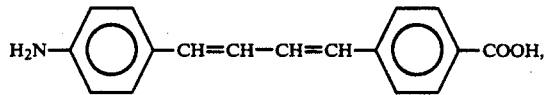
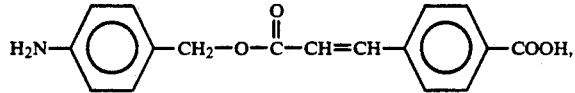

-continued

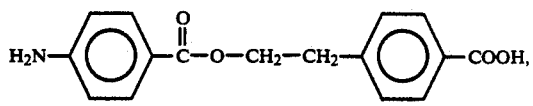

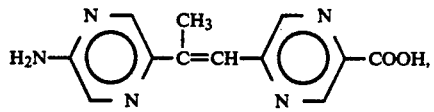

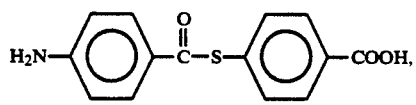

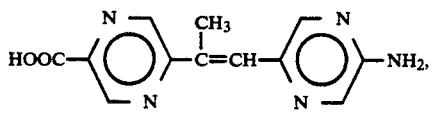

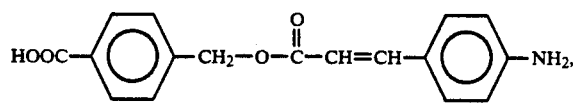

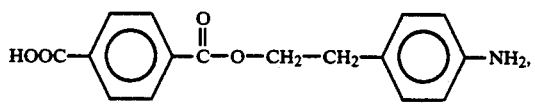

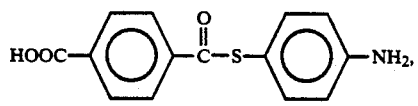

mixtures thereof and the like.

Representative of the phenolic hydroxyl containing carboxylic acid compounds which are free of mesogenic or rodlike moieties include, for example, 2-hydroxybenzoic acid, 3-hydroxybenzoic acid, 4-hydroxybenzoic acid, 2-methoxy-4-hydroxybenzoic acid, 3,5-dimethyl-4-hydroxybenzoic acid, 3-cyclohexyl-4-hydroxybenzoic acid, 2,6-dibromo-4-hydroxybenzoic acid, 5-butyl-4-hydroxybenzoic acid, 3-phenyl-4-hydroxybenzoic acid, 4-(1-(3-hydroxyphenyl)-1-methylethyl)benzoic acid, 4-(1-(4-hydroxyphenyl)ethyl)benzoic acid, 4-(4-hydroxyphenoxy)benzoic acid, 4-((4-hydroxyphenyl)thio)benzoic acid, (4-hydroxyphenyl)(4-carboxyphenyl)methanone, 4-((4-hydroxyphenyl)sulfonyl)benzoic acid, 4-(1-(4-hydroxy-3,5-dibromophenyl)-1-methylethyl)-2,6-dibromobenzoic acid, 4-hydroxyphenylacetic acid, 3-hydroxyphenylacetic acid, 2-hydroxyphenylacetic acid, 4-hydroxyphenyl-2-cyclohexanecarboxylic acid, 4-hydroxyphenoxy-2-propanoic acid mixtures thereof and the like.

Representative of the phenolic hydroxy containing carboxylic acid compounds containing one or more mesogenic or rodlike moieties include, for example,

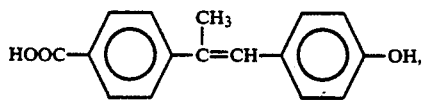

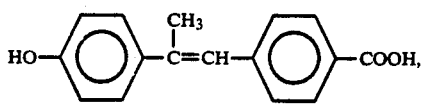

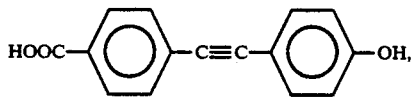

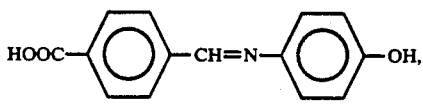

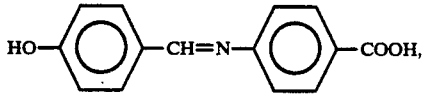

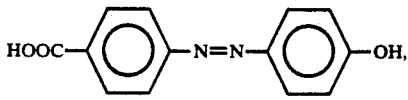

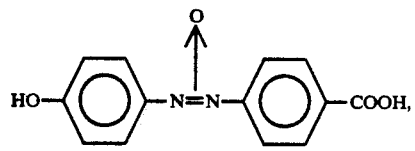
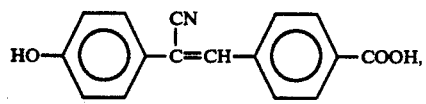
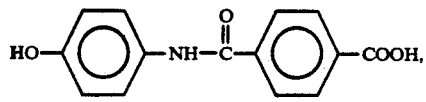
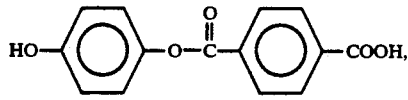
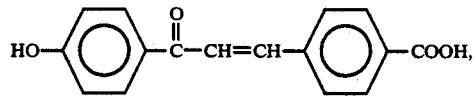
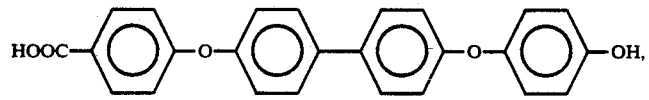
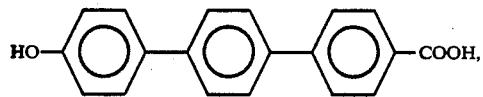
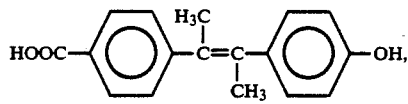
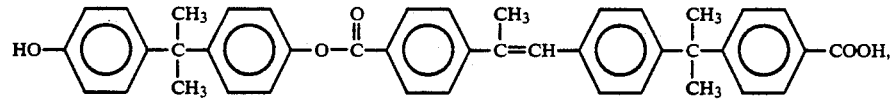
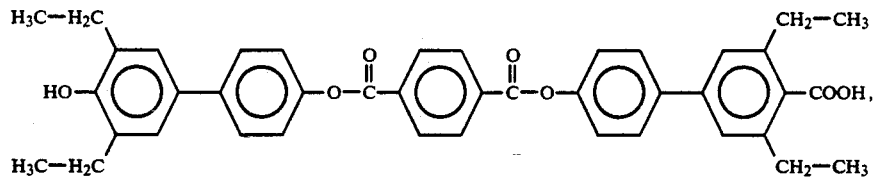
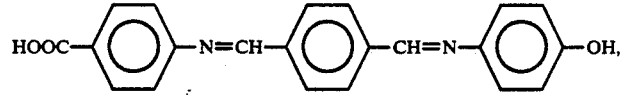
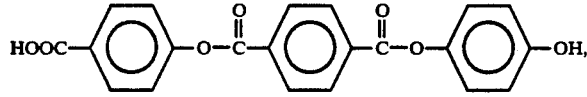
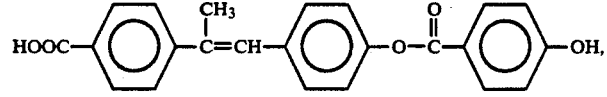
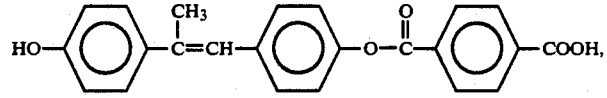

-continued
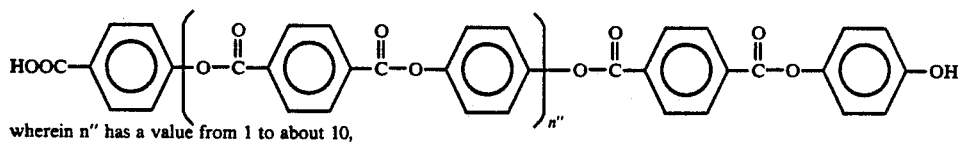
wherein n″ has a value from 1 to about 10,
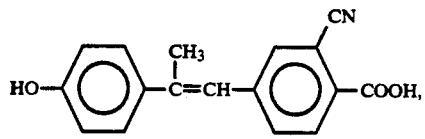 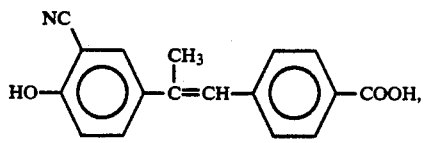
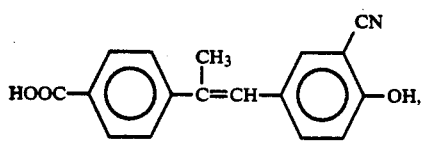 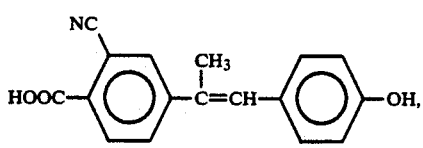
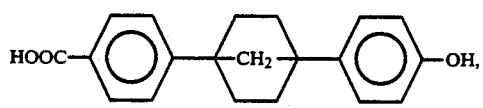
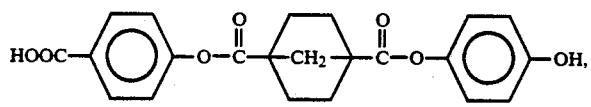
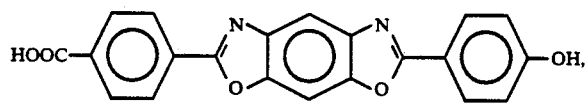
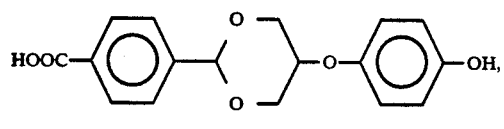 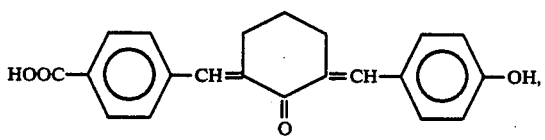
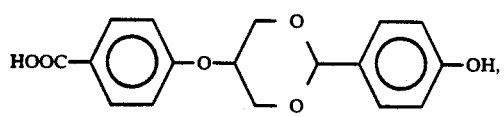 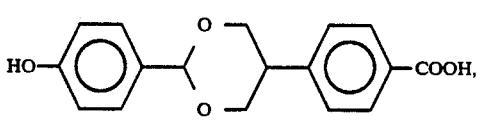
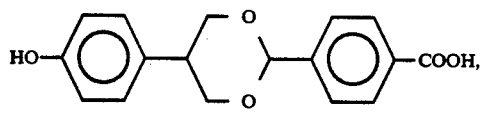 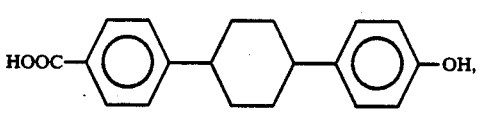
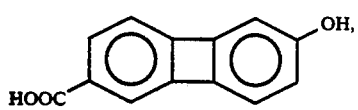 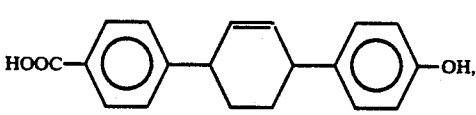
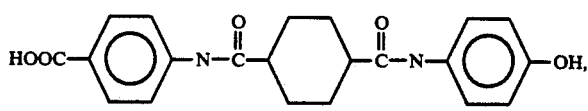
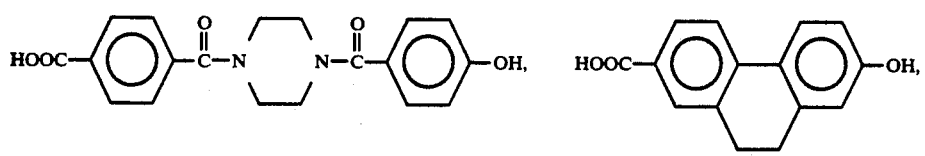

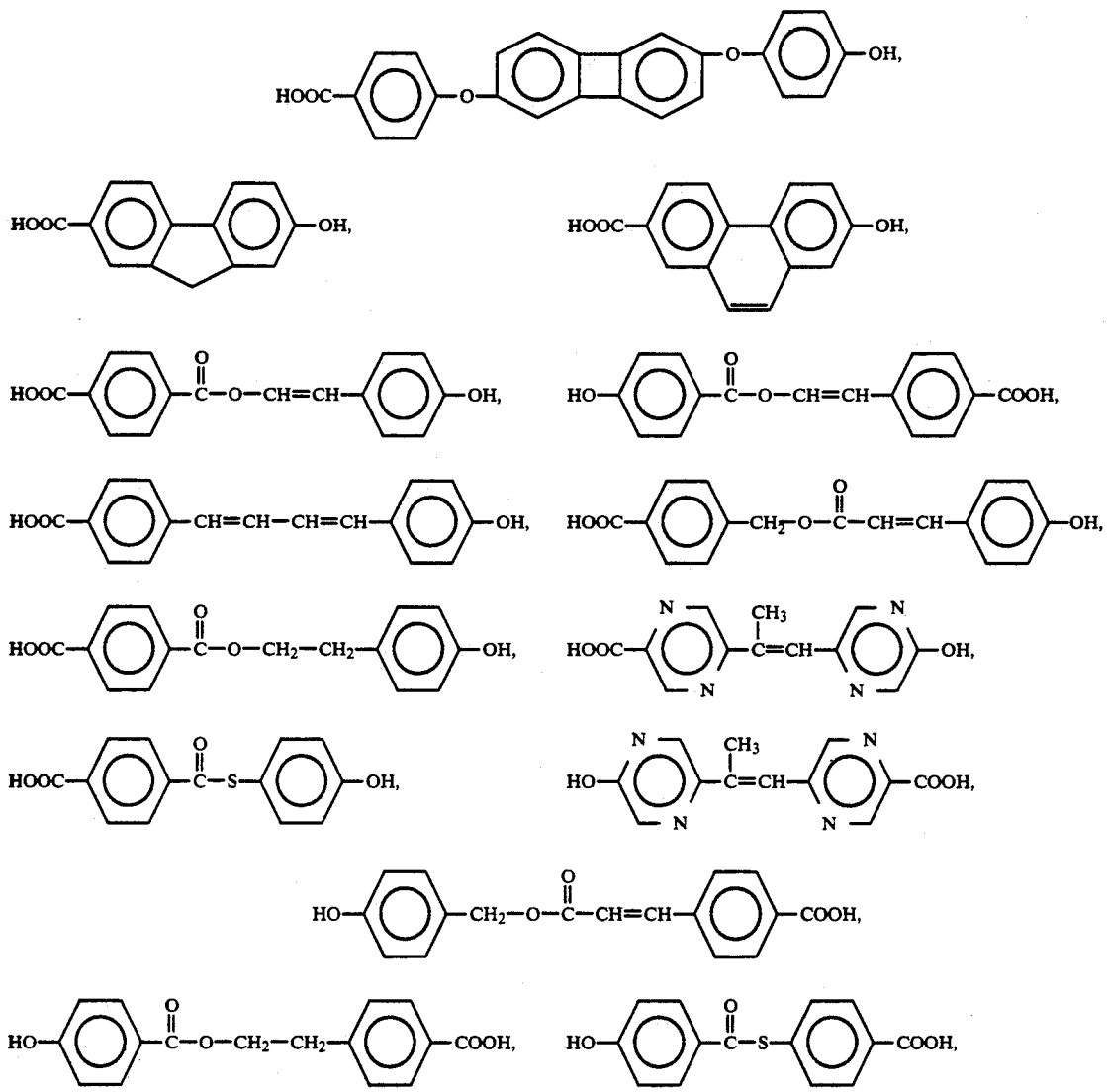

mixtures thereof and the like.

Representative of the sulfanilamide compounds which are free of mesogenic or rodlike moieties include, for example, o-sulfanilamide, m-sulfanilamide, p-sulfanilamide, 2,6-dimethyl-4-sulfonamide-1-aminobenzene, 2-methyl-4-sulfonamido-1-aminobenzene, 3,5-dimethyl-4-sulfonamido-1-aminobenzene, 3-methyl-4-sulfonamido-1aminobenzene, 5-methyl-3-sulfonamido-1-aminobenzene, 3-phenyl-4-sulfonamido-1-aminobenzene, 4-(1-(3-sulfonamidophenyl)-1-methylethyl)aniline, 4-(1-(4-sulfonamidophenyl)ethyl)aniline, 4-(4-sulfonamidophenoxy)aniline, 4-((4-sulfonamidophenyl)thio)aniline, (4-sulfonamidophenyl)(4-aminophenyl)methanone, 4-((4-sulfonamidophenyl)sulfonyl)aniline, 4-(1-(4-sulfonamido-3,5-dibromophenyl)-1-methylethyl)-2,6-dibromoaniline, 4-sulfonamido-1-N-methylaminobenzene, mixtures thereof and the like.

Representative of the sulfanilamide compounds containing one or more mesogenic or rodlike moieties include, for example,

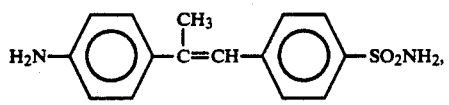 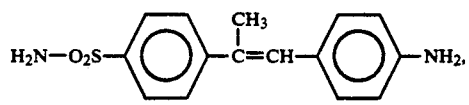

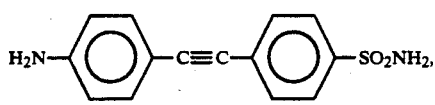 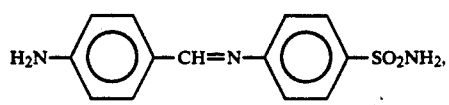

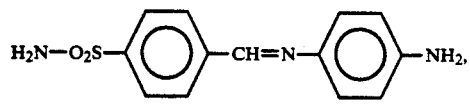
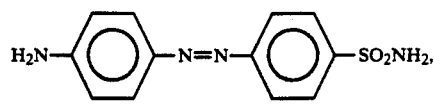
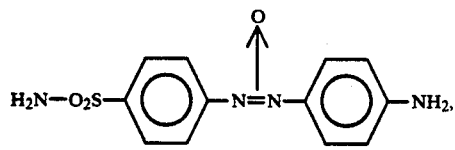
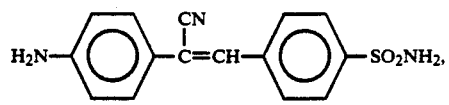
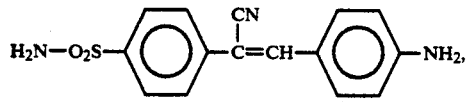
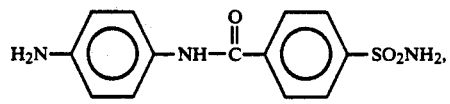
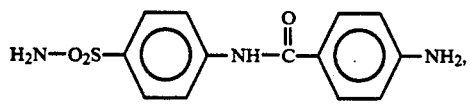
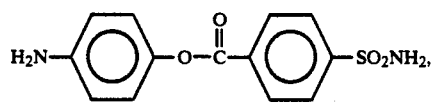
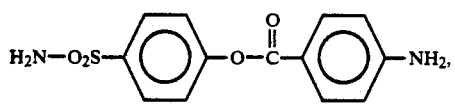
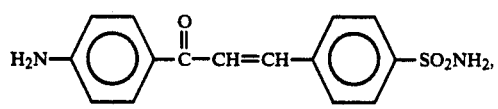
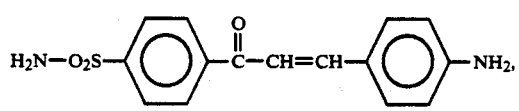
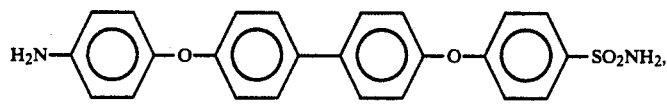
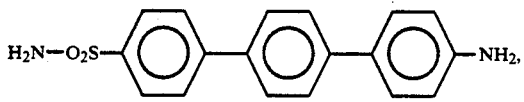
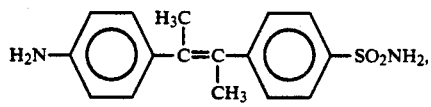
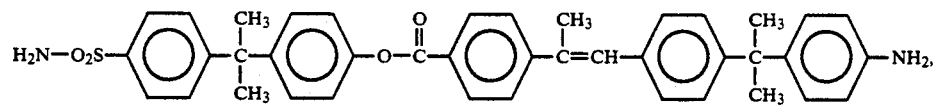
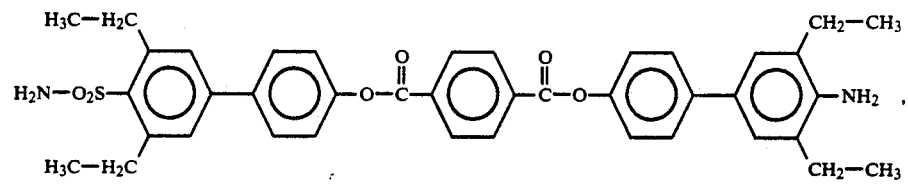
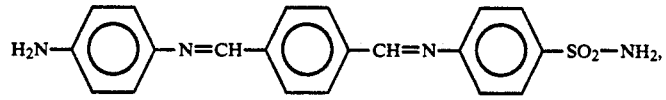
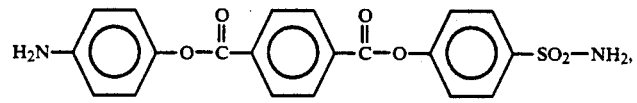
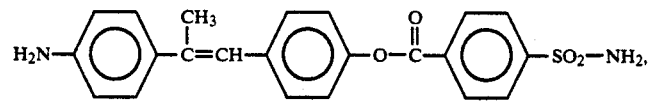

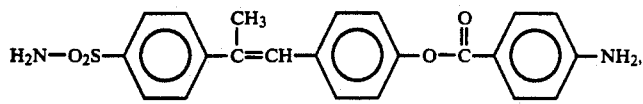
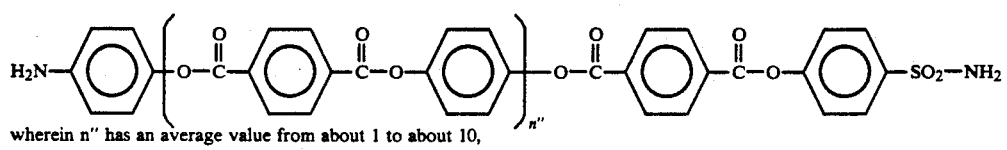
wherein n" has an average value from about 1 to about 10,
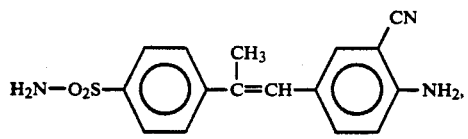 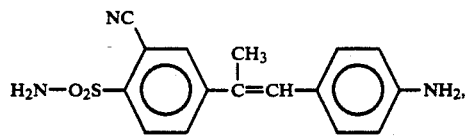
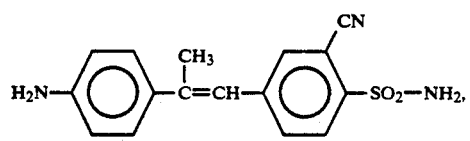 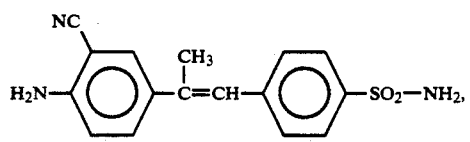
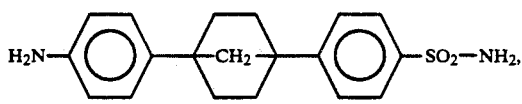
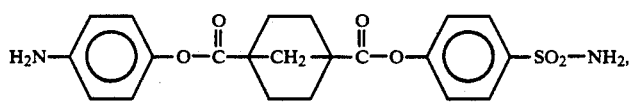
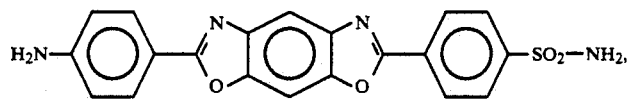
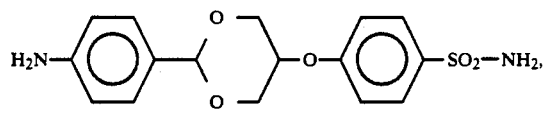
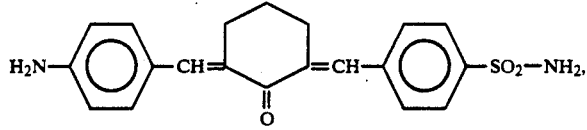
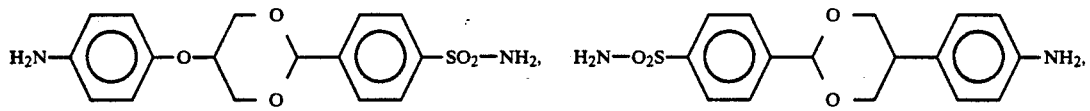
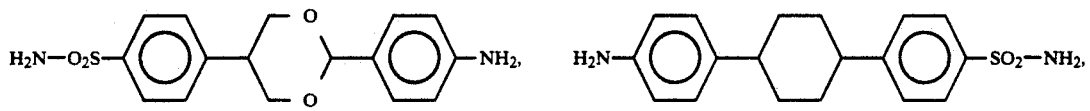
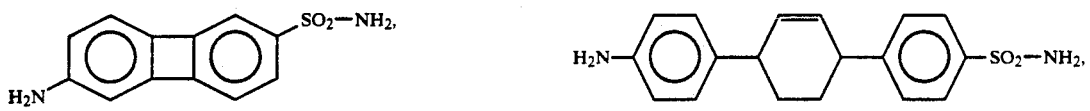

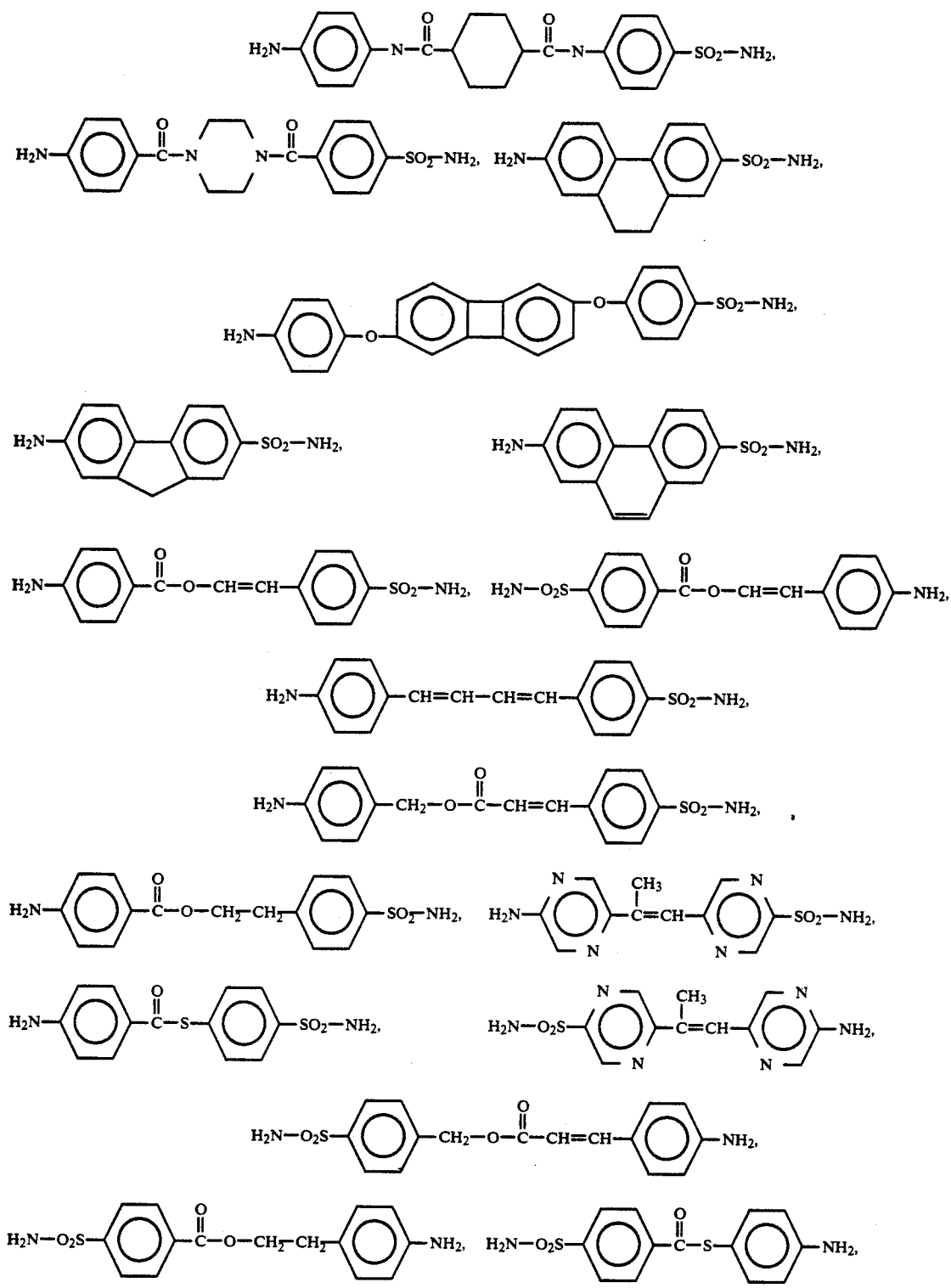

mixtures thereof and the like.

ADDUCTS

The adducts containing one or more mesogenic or rodlike moieties of the present invention are prepared by reacting (B) one or more materials containing two or more hydrogens which are reactive with an epoxide group selected from the group consisting of (1) di- and polyphenols, (2) di- and polycarboxylic acids, (3) di- and polymercaptans, (4) di- and polyamines, (5) primary monoamines, (6) sulfonamides, (7) aminophenols, (8) aminocarboxylic acids, (9) phenolic hydroxyl containing carboxylic acids, (10) sulfanilamides, (11) mixtures thereof with one or more (A) epoxy resins in an amount sufficient to provide from about 2:1 to about 100:1, preferably from about 3:1 to about 20:1, most preferably from about 5:1 to 10:1 equivalents of hydrogen reactive with an epoxide group (excluding secondary hydroxyl groups formed by epoxide ring opening reaction to form the adduct) per equivalent of epoxide reacted, with the proviso that one or more mesogenic or rodlike moieties are present in either (A) the epoxy resin reactant or (B) the material containing two or more hydrogens which are reactive with an epoxide group or in both (A) and (B).

The term "reactive with an epoxide group", as employed in the preparation of the adduct means reactive at the conditions employed to prepare the adduct. There may be present hydrogen atoms which are non-reactive with the epoxide group at the conditions employed to prepare the adduct, but which are reactive at conditions at which an epoxy resin is cured with the resultant adduct. In which case, the hydrogen atoms which are not reactive with the epoxy resin at the conditions at which the adduct is prepared are not considered in the aforementioned reactive hydrogen to epoxide ratios.

The term "epoxy resin adduct" as used herein includes the epoxy resin wherein the terminal epoxide groups have been reacted in a ring opening reaction with the material containing two or more hydrogens which are reactive with an epoxide group to give the characteristic 2-hydroxypropyl functionality as a linkage between the residual epoxy resin structure and the residual structure from the material containing two or more hydrogens which are reactive with an epoxide group. A typical example is the reaction product of aniline and the glycidyl ether of 4,4'-dihydroxy-alpha-methylstilbene:

molecule of the material containing two or more hydrogens which are reactive with an epoxide group. A typical example is shown for the reaction of aniline and the glycidyl ether of 4,4'-dihydroxy-alpha-methylstilbene:

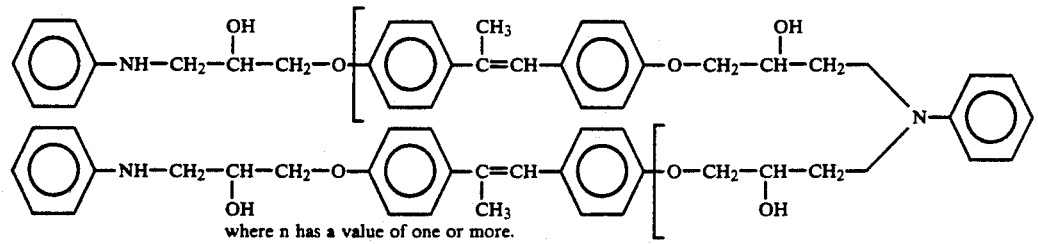
where n has a value of one or more.

The adduct may also contain unreacted material containing two or more hydrogens which are reactive with an epoxide group. Thus in the case of the reaction between aniline and the glycidyl ether of 4,4'-dihydroxy-alpha-methylstilbene, if stoichiometric excess of aniline is employed and not removed, it thus becomes a part of the epoxy resin adduct. The adduct may also contain branched or crosslinked structure derived from (A) reaction between an epoxide group and the hydroxyl group of a 2-hydroxypropyl linkage contained in said adduct, or (B) reaction between three separate epoxy resin molecules with three hydrogens in a molecule of the material containing two or more, in this case, more, hydrogens which are reactive with an epoxide group. A typical example of the former case, (A), is the reaction of a backbone hydroxyl group of the epoxy resin adduct of aniline and the diglycidyl ether of 4,4'-dihydroxy-alpha-methylstilbene with an epoxide group from a second molecule of the diglycidyl ether of 4,4'-dihydroxy-alpha-methylstilbene which has already been adducted with aniline at one epoxide group of the molecule:

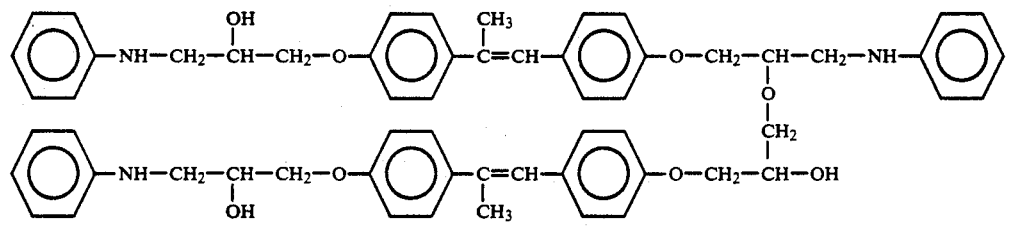

A typical example of the latter case, (B), is the reaction of an amino hydrogen of the epoxy resin adduct of diethylenetriamine and the diglycidyl ether of 4,4'-dihydroxy-alpha-methylstilbene wherein an epoxide group from a second molecule of the diglycidyl ether of 4,4'-dihydroxy-alpha-methylstilbene has already reacted with another amino hydrogen in the diethylenetriamine

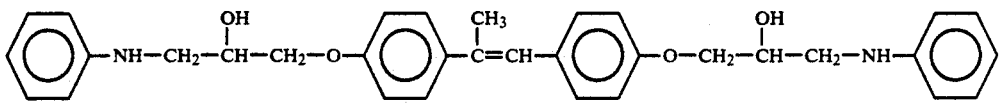

The adduct may also contain oligomeric components derived from reaction of epoxide groups from two separate epoxy resin molecules with two hydrogens in a moiety (only one end of each of the epoxide molecules shown):

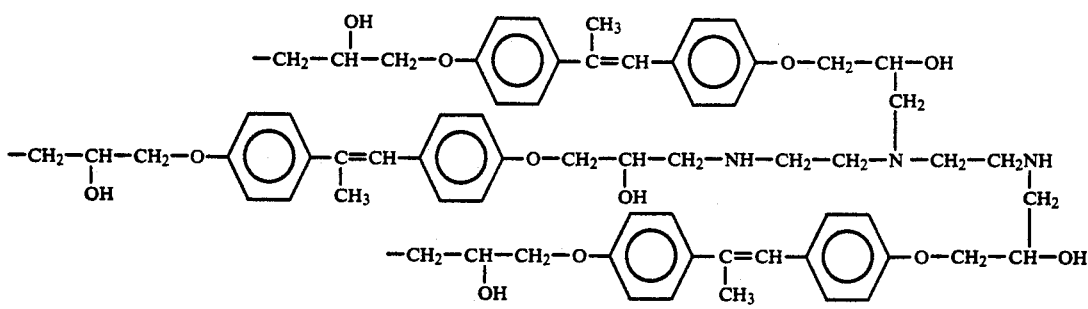

Minor amounts of other structures may be present in the adducts of the present invention, for example, those which may be present in the epoxy resin reactant, such as, the 1,2-glycol group derived from hydrolysis of the epoxide group, or halomethyl groups caused by addition of epihalohydrin to the hydroxyl group of an intermediate halohydrin molecule.

A catalyst is optionally employed to prepare the adducts containing one or more mesogenic or rodlike moieties of the present invention. Suitable catalysts include the aforementioned phosphines, quaternary ammonium compounds, phosphonium compounds, tertiary amines, mixtures thereof and the like. The amount of catalyst used, if any, depends upon the particular reactants and catalyst employed; however, it is usually employed in quantities from about 0.01 to about 3, preferably from about 0.01 to about 1.5, most preferably from about 0.03 to about 0.75 percent by weight based upon the weight of the epoxy containing compound.

Reaction conditions for forming the adducts containing one or more mesogenic or rodlike moieties of the present invention vary widely depending upon the type and amount of reactants employed, the type and amount of catalyst used, if any, the use of solvent(s), the mode of addition of the reactants employed, and other known variables. Thus, the reaction may be conducted at atmospheric, superatmospheric or subatmospheric pressures at temperatures of from about 0° C. to about 260° C., preferably from about 20° C. to about 200° C., most preferably from about 35° C. to about 160° C. The time required to complete the reaction depends not only upon the aforementioned variables, but also upon the temperature employed. Higher temperatures require shorter periods of time whereas lower temperatures require longer periods of time. Generally, however, times of from about 5 minutes to about one week, more preferably from about 30 minutes to about 72 hours, most preferably from about 60 minutes to about 48 hours are suitable. The reaction time and temperature profile employed can greatly influence the distribution of components comprising the epoxy resin adducts of the present invention, thus, higher reaction temperatures with their inherently shorter reaction times, generally induce the formation of more oligomeric component when a material containing two hydrogens reactive with an epoxide group is used, or, additionally, branched or crosslinked structure when a material containing more than two hydrogens reactive with an epoxide group is used.

The reaction to form the adducts containing one or more mesogenic or rodlike moieties of the present invention may be conducted in the presence of one or more solvents. Solvents may be beneficially employed, for example, to improve the solubility of one or more reactants in the reactant mixture, to dissolve a solid reactant thus rendering it easier to meter into the reaction, or to dilute the concentration of reacting species as a means to moderate the adduct forming reaction and thus vary the distribution of components comprising the adduct. Suitable solvents include those which are substantially inert to reaction with any of the reactants employed or the adduct product formed therefrom. Thus the solvents and amounts of said solvents previously described for the advancement reaction are generally suitable for use in the adduct forming reaction.

The contacting together of (A) one or more epoxy resins and (B) one or more materials containing two or more hydrogens which are reactive with an epoxide group selected from the group consisting of (1) di- and polyphenols, (2) di- and polycarboxylic acids, (3) di- and polymercaptans, (4) di- and polyamines, (5) primary monoamines, (6) sulfonamides (7) aminophenols, (8) aminocarboxylic acids. (9) phenolic hydroxyl containing carboxylic acids, (10) sulfanilamides, (11) mixtures thereof with the proviso that one or more mesogenic or rodlike moieties may be present in the epoxy resin reactant (A) or the material containing two or more hydrogens which are reactive with an epoxide group (B) or in both (A) and (B) may be done in any configuration which provides an adduct that is essentially free of epoxide groups. Thus, the epoxy resin component and the material containing two or more hydrogens which are reactive with an epoxide group may be directly mixed together and subjected to the aforesaid conditions conducive to reaction, or one component may be added to the other component in increments including up to continuous addition. If increments are added, all or a part of an added increment may be allowed to react prior to addition of the next increment. Generally, the incremental addition of the epoxy resin reactant to the bulk of the material containing two or more hydrogens which are reactive with an epoxide group favors an adduct composed of material wherein the terminal epoxide groups have been reacted in a ring opening reaction with said material containing two or more hydrogens which are reactive with an epoxide group to give the characteristic 2-hydroxypropyl functionality as a linkage between the residual epoxy resin structure and the residual structure from the material containing two or more hydrogens which are reactive with an epoxide group, and lesser amounts, if any, oligomeric component.

Various post treatments may be applied to the adducts containing one or more mesogenic or rodlike moieties of the present invention as a means to vary the distribution of components comprising the adduct, to modify the reactivity of the adduct with an epoxy resin, to modify the physical state of the adduct, or for other known reasons. As a specific example, in the preparation of the adduct of aniline and the diglycidyl ether of 4,4'-dihydroxy-alpha-methylstilbene, a large stoichiometric excess of primary amine groups derived from the aniline, with respect to epoxide groups derived from the diglycidyl ether of 4,4'-dihydroxy-alpha-methylstilbene may be used to favor an adduct with a low content of oligomeric component, however, the finished reaction product now contains, as a part of the adduct composition, a high concentration of aniline as the unreacted material containing two or more hydrogens which are reactive with an epoxide group. In the method of the present invention, post treatment of the adduct via vacuum distillation to strip out the unreacted aniline may be employed. Many other alternate methods of post treatment to vary the distribution of the components comprising the adducts of the present invention may be employed, such as, for example, recrystallization, chromatographic separation, zone refining, crystal refining, wiped film distillation, extraction, preferential chemical derivatization of one or more components of said adduct followed by its removal, combinations thereof and the like. Another class of post treatments of the adducts of the present invention involves the addition of one or more components to the epoxy resin adduct to modify one or more properties of said adduct. For example, one or more accelerators or retarding agents may be blended with the finished adduct to modify its subsequent reactivity in curing of an epoxy resin. As a second example, one or more epoxy resin curing agents, such as, for example, those delineated herein may be added to the finished adduct.

The many factors delineated above which can be manipulated to influence the composition of the adducts containing one or more mesogenic or rodlike moieties of the present invention are beneficially used in conjunction with each other rather than separately. Thus, incremental or slow continuous addition of the epoxide reactant to a large stoichiometric excess of the material containing two or more hydrogens which are reactive with an epoxide group maintained at a relatively low reaction temperature, followed by removal of the excess unreacted material containing two or more hydrogens which are reactive with an epoxide group, favors an adduct composed of material wherein the terminal epoxide groups have been reacted in a ring opening reaction with said material containing two or more hydrogens which are reactive with an epoxide group to give the characteristic 2-hydroxypropyl functionality as a linkage between the residual epoxy resin structure and the residual structure from the material containing two or more hydrogens which are reactive with an epoxide group, and lesser amounts, if any oligomeric component.

Certain of the materials containing two or more hydrogens which are reactive with an epoxide group which possess dual functional groups, that is, (B-7) aminophenols, (B-8) aminocarboxylic acids and (B-9) phenolic hydroxyl containing carboxylic acids and (B-10) sulfanilamides represent materials which may be utilized under conditions to provide differential reactivity of said functional groups with the epoxide group.

Thus, the adduct can be formed by preferential reaction of one type of functional group with the epoxide group while leaving substantially unreacted the second type of functional group. As a typical example, p-N-methylaminomethylphenol reacted under mild conditions (low temperature and long reaction time using incremental or slow continuous addition of the epoxy resin in a solvent to the aminophenol in a solvent) with the diglycidyl ether of 4,4'-dihydroxy-alpha-methylstilbene favors the phenolic terminated epoxy resin adduct:

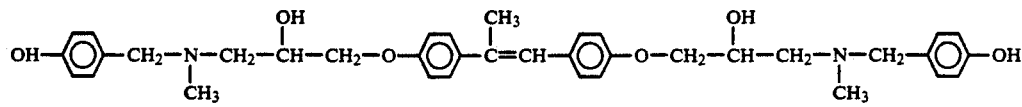

Catalysis favoring reaction of one functional group over another with the epoxide group may also beneficially be employed.

Certain of the adducts containing one or more mesogenic or rodlike moieties of the present invention may also be prepared via reaction of one or more monoepoxide compounds with one or more materials containing four or more hydrogen atoms which are reactive with an epoxide group. A typical example is the adduct prepared by reaction of an aromatic primary diamine such as 4,4'-diaminostilbene or 4,4'-diaminobenzanilide with a monoepoxide such as phenyliglycidyl ether, in a 2:1 amine hydrogen to epoxide equivalent ratio.

THERMOSETTABLE (CURABLE) MIXTURES

The thermosettable mixtures of the present invention are prepared by mixing together one or more of the adducts containing one or more mesogenic or rodlike moieties with one or more epoxy resins, all, none, or a part of which may contain one or more mesogenic or rodlike moieties. The adducts are employed in amounts which will effectively cure the mixture, with the understanding that these amounts will depend upon the particular adduct and epoxy resin employed. Generally, suitable amounts of the adduct include amounts which will provide from about 0.80:1 to about 1.50:1 equivalents of hydrogen which is reactive with an epoxide group per equivalent of epoxide group in the epoxy resin at the conditions employed for curing.

The application of heat or a combination of heat and pressure may be employed in the curing of the thermosettable mixtures of the present invention. Temperatures employed can vary over a considerable range but are usually in the range of 200° C. to 250° C. Depending upon the relative solubility and phase transition temperature(s) associated with the mesogenic or rodlike moieties present in the thermosettable compositions, curing at an elevated temperature can be especially desirable to enhance the molecular anisotropy of the cured product.

The thermosettable mixtures of the present invention may also contain one or more of the known curing agents for epoxy resins such as, for example, primary and secondary polyamines, carboxylic acids and anhydrides thereof, aromatic hydroxyl containing compounds, imidazoles, guanidines, urea-aldehyde resins, alkoxylated urea-aldehyde resins, melamine-aldehyde resins, alkoxylated melamine-aldehyde resins, aliphatic amines, cycloaliphatic amines, aromatic amines, epoxy resin adducts free of mesogenic or rodlike moieties, combinations thereof and the like. Particularly suitable curing agents include, for example, methylenedianiline, 4,4'-diaminostilbene, 4,4'-diaminobenzanilide, 4,4'-diamino-alpha-methylstilbene, dicyandiamide, ethylenediamine, diethylenetriamine, triethylenetetramine, tetraethylenepentamine, ureaformaldehyde resins, melamine-formaldehyde resins, methylolated urea-formaldehyde resins, methylolated melamine-formaldehyde resins, phenol-formaldehyde novolac resins, sulfanilamide, diaminodiphenylsulfone, diethyltoluenediamine, t-butyltoluenediamine, bis-4-aminocyclohexylmethane, isophoronediamine, diaminocyclohexane, hexamethylenediamine, piperazine, aminoethylpiperazine, 2,5-dimethyl-2,5-hexanediamine, 1,12-dodecanediamine, tris-3-aminopropylamine, combinations thereof and the like. If used as a component of the thermosettable mixtures of the present invention, from about 1 to about 99, preferably from about 1 to about 40, most preferably from about 1 to about 20 percent of the equivalents of hydrogen which are reactive with an epoxide group provided by the adduct containing one or more mesogenic or rodlike moieties are substituted out by using one or more of the aforesaid curing agents.

ORIENTATION

During processing prior to curing and/or during cure of the curable epoxy resin compositions into a part, electric or magnetic fields or shear stresses can be applied for the purpose of orienting the mesogenic or rodlike moieties contained or developed therein which in effect improves the mechanical properties. As specific examples of these methods, Finkelmann, et al, *Macromol. Chem.*, 180, 803–806 (March 1979) induced orientation in thermotropic methacrylate copolymers containing mesogenic side chain groups decoupled from the main chain via flexible spacers in an electric field. Orientation of mesogenic side chain groups decoupled from the polymer main chain via flexible spacers in a magnetic field has been demonstrated by Roth and Kruecke, *Macromol. Chem.*, 187, 2655–2662 (November 1986). Magnetic field induced orientation of mesogenic main chain containing polymers has been demonstrated by Moore, et al, *ACS Polymeric Material Sciences and Engineering*, 52, 84–86 (April-May 1985). Magnetic and electric field orientation of low molecular weight mesogenic compounds is discussed by W. R. Krigbaum in *Polymer Liquid Crystals*, pages 275–309 (1982) published by Academic Press, Inc. All of the above are incorporated herein by reference in their entirety.

In addition to orientation by electric or magnetic fields, polymeric mesophases can be oriented by drawing and/or shear forces which are induced by flow through dies, orifices, and mold gates. A general discussion for orientation of thermotropic liquid crystal polymers by this method is given by S. K. Garg and S. Kenig in *High Modulus Polymers*, pages 71–103 (1988) published by Marcel Dekker, Inc. which is incorporated herein by reference. For the mesomorphic systems based on the epoxy resin compositions, this shear orientation can be produced by processing methods such as injection molding, extrusion, pultrusion, filament winding, filming and prepreging.

The thermosettable mixtures of the present invention can be blended with other materials such as solvents or diluents, fillers, pigments, dyes, flow modifiers, thickeners, reinforcing agents, mold release agents, wetting agents, stabilizers, fire retardant agents, surfactants, combinations thereof and the like.

These additives are added in functionally equivalent amounts, e.g., the pigments and/or dyes are added in quantities which will provide the composition with the desired color; however, they are suitably employed in amounts of from about zero to about 20, more suitably from about 0.5 to about 5, most suitably from about 0.5 to about 3 percent by weight based upon the weight of the total blended composition.

Solvents or diluents which can be employed herein include, for example, hydrocarbons, ketones, glycol ethers, aliphatic ethers, cyclic ethers, esters, amides, monoepoxides, combinations thereof and the like. Particularly suitable solvents or diluents include, for example, toluene, benzene, xylene, methyl ethyl ketone, methyl isobutyl ketone, diethylene glycol methyl ether, dipropylene glycol methyl ether, dimethylformamide, N-methylpyrrolidinone, tetrahydrofuran, propylene glycol methyl ether, 4-tertiary-butylphenyl glycidyl ether, cresyl glycidyl ether, epoxidized soybean oil, combinations thereof and the like.

The modifiers such as thickeners, flow modifiers and the like can be 3suitably employed in amounts of from zero to about 10, more suitably from about 0.5 to about 6, most suitably from about 0.5 to about 4 percent by weight based upon the weight of the total composition.

Reinforcing materials which can be employed herein include natural and synthetic fibers in the form of woven fabric, mats, monofilament, multifilament, unidirectional fibers, rovings, random fibers or filaments, inorganic fillers of whiskers, hollow spheres, and the like. Suitable reinforcing materials include, glass, ceramics, nylon, rayon, cotton, aramid, graphite, polyalkylene terephthalates, polyethylene, polypropylene, polyesters, combinations thereof and the like.

Suitable fillers which can be employed herein include, for example, inorganic oxides, ceramic microspheres, plastic microspheres, glass microspheres, inorganic whiskers, $CaCO_3$, combinations thereof and the like.

The fillers can be employed in amounts suitable from about zero to about 95, more suitably from about 10 to about 80, most suitably from about 40 to about 60 percent by weight based upon the weight of the total composition.

The compositions of the present invention are useful in, but not limited to, applications such as coatings, encapsulations, extrusions, moldings, pultrusions, electrical and structural laminates or composites, and the like. In some instances, they can be formed into monofilament and multifilament fibers.

The following examples are illustrative of the present invention, but are not to be construed as to limiting its scope in any manner.

EXAMPLE 1

A. Synthesis of 4,4'-Dihydroxy-alpha-methylstilbene

Phenol (376.44 grams, 4.0 moles), chloroacetone (205.62 grams, 2.0 moles as chloroacetone) and methylene chloride (300 grams) were added to a reactor and cooled to $-10°$ C. with stirring. The chloroacetone used was a technical grade containing 90% chloroacetone, 2.5% acetone, 6.5% 1,1-dichloroacetone and 1.0% 1,3-dichloroacetone, Concentrated sulfuric acid (196.16 grams, 2.0 mole) was added to dropwise to the stirred solution over a thirty minute period so as to maintain the reaction temperature between $-9$ and $-11°$ C.

After two hours of post reaction between the −9 to −11° C. temperature, the viscous orange oil solution was mixed with 500 milliliters of iced deionized water. The oil solution was separated then washed with a second 500 milliliter portion of iced deionized water. After separation, the recovered oil solution was added to a 2 liter beaker along with 250 milliliters of ethanol and stirred to provide a solution. Deionized water (250 milliliters) was added to the stirred solution and heating commenced. As the temperature of the mixture increased, the stirred mixture began to clear. Each time clearing was observed, sufficient deionized water was added to induce cloudiness, followed by continuation of the mixing and heating. Once the temperature reached 70° C., a massive precipitation of white crystalline plates occurred and was followed by immediate coalesence of the precipitated product to an oil. The oil layer was recovered by decantation of the water layer and 250 milliliters of ethanol was added. Deionized water was again added to the stirred solution as heating commenced, in an amount sufficient to induce cloudiness each time clearing was observed. Once the temperature reached 90° C., a massive precipitation of white crystalline plates again occurred. At this time, stirring was stopped and the crystalline slurry, as well as the decanted water layer were both chilled to 5° C. and held therein for 12 hours. The crystalline product was recovered by filtration, combined with 250 milliliters of deionized water then stirred with heating to 90° C. After cooling to 5° C., the crystalline product was recovered by filtration then dried in a vacuum oven at 100° C. and 5 mm Hg to a constant weight of 226.7 grams. Proton magnetic resonance spectroscopy and infrared spectrophotometric analysis confirmed the product structure.

B. Epoxidation of 4,4′-Dihydroxy-alpha-methylstilbene 4,4′-Dihydroxy-alpha-methylstilbene (141.41 grams, 1.25 hydroxyl equivalent) from A above, epichlorohydrin (578.31 grams, 6.25 moles), deionized water (50.92 grams, 8.0 percent by weight of the epichlorohydrin used) and isopropanol (311.40 grams, 35 percent by weight of the epichlorohydrin used) were added to a reactor and heated to 55° C. with stirring under a nitrogen atmosphere. Once the 55° C. reaction temperature was achieved, sodium hydroxide (45.0 grams, 1.125 mole) dissolved in deionized water (180 grams) was added dropwise to the reactor over a 45 minute period so as to maintain reaction temperature between 55 and 58° C. Ten minutes after completion of the aqueous sodium hydroxide addition, the stirring was stopped and the aqueous layer which separated from the reaction mixture was pipetted off and discarded. Stirring was resumed and after a total of twenty minutes following completion of the initial aqueous sodium hydroxide addition, a second solution of sodium hydroxide (20.0 grams, 0.50 mole) dissolved in deionized water (80 grams) was added to the reactor over a twenty minute period so as to maintain the 55° C. reaction temperature. Fifteen minutes after completion of the aqueous sodium hydroxide addition, the recovered reaction mixture was added to a separatory funnel and washed with 750 milliliters of deionized water. The separated organic layer was washed a second time (750 milliliters deionized water), recovered and then rotary evaporated under vacuum for 45 minutes at 110° C. then 30 minutes at 130° C. The product was recovered (208.4 grams) as a crystalline off-white solid with an epoxide equivalent weight of 177.61.

C. Characterization of Liquid Crystallinity in the Diglycidyl Ether of 4,4′-Dihydroxy-alpha-methylstilbene.

A portion (10.84 milligrams of the diglycidyl ether of 4,4′-dihydroxy-alpha-methylstilbene prepared using the method of B above was analyzed by differential scanning calorimetry using a heating rate of 10° C. per minute and a temperature range of 30 to 150° C. The following results were obtained:

| Cycle Designation | Observed Transition Temperatures (°C.) midpoint/range | Enthalpy (J/G) | Comments |
| --- | --- | --- | --- |
| First heat (30 to 150° C.) | 73/55–84 | 6.3 | — |
| | 122/84–130 | 41.8 | |
| First cooling (150 to 30° C.) | —/81–52 | — | 2 unresolved broad, flat peaks |
| Second heat (30 to 150° C.) | 81/48–92 (shoulder at 69) | 31.4 | — |
| | 124/108–132 | 3.6 | |
| Second cooling (150 to 30° C.) | (same as observed for the first cooling) | | |

Analysis of the diglycidyl ether via polarized light microscopy was completed using a microscope equipped with a programmable hot stage using a heating rate of 20° C. per minute. The following results were obtained:

| Cycle Designation | Observed Transition Temperatures (°C.) | Comments |
| --- | --- | --- |
| First heat | 109 | First fluidity noted. |
| | 137 | Isotropization completed. |
| First cooling | 91 | First mobile nematic droplets observed. |
| | 51 | First crystallization noted. |
| Second heat | 63 | First fluidity noted. |
| | 78 | Flows to nematic texture. |
| | 86 | Isotropization completed but minor crystalline fraction still present. |
| | 133 | All crystalline fraction melted. |
| Second cooling | (same as observed for the first cooling) | |

The diglycidyl ether is a monotropic liquid crystal with a nematic texture. Two fractions are present; the minor higher melting crystalline fraction becomes liquid crystalline at 91° C. (microscopic observation) followed by the development of liquid crystallinity in the second, lower melting fraction. This accounts for the broadness and overlapping observed in the cooling cycles by differential scanning calorimetry.

D. Preparation of Adduct from Aniline and Diglycidyl Ether of 4,4'-Dihydroxy-alpha-methylstilbene Aniline (465.58 grams, 5.0 moles) was added to a 2 liter reactor equipped with a cooled condenser (5° C.) and stirred under a nitrogen atmosphere with heating to 90° C. A solution of the diglycidyl ether of 4,4'-dihydroxy-alpha-methylstilbene from C above (88.81 grams, 0.50 epoxide equivalent) dissolved in 1,4-dioxane (355.22 grams) was pumped into the reactor at a rate of 1.7817 grams per minute while maintaining the 90° C. reaction temperature. After completion of addition of the diglycidyl ether solution in 1,4-dioxane, the reactor was held at 90° C. for an additional 48 hours. At the end of the 48 hours of post reaction, the solution was recovered and rotary evaporated under vacuum for one hour at 900° C. then four hours at 150° C. and 2 mm Hg. The product was recovered (134.18 grams) as a light amber transparent solid at 25° C. Infrared spectrophotometric analysis of a film sample of the product on a sodium chloride plate demonstrated that complete conversion of epoxide groups had occurred. Titration of a portion of the product for total nitrogen content demonstrated the presence of 3.5300 milliequivalents N per gram of product. Titration of a portion of the product which had been acetylated with acetic anhydride for tertiary nitrogen content demonstrated the presence of 0.0860 milliequivalents tertiary N per gram of product. By difference, the total secondary amine content was calculated to be 3.444 milliequivalents >N—H per gram of product.

COMPARATIVE EXPERIMENT 1

Preparation of Adduct of Aniline and Diglycidyl Ether of 4,4'-Isopropylidenediphenol Aniline (931.16 grams, 10.0 moles) was added to a 2 liter reactor equipped with a cooled condenser (5° C.) and stirred under a nitrogen atmosphere with heating to 90° C. A solution of the diglycidyl ether of 4,4'-isopropylidenediphenol (bisphenol A) (179.95 grams, 1.0 epoxide equivalent) having an epoxide equivalent weight of 179.95 dissolved in 1,4-dioxane (359.90 grams) was pumped into the reactor at a rate of 1.069 grams per minute while maintaining the 90° C. reaction temperature. After completion of addition of the diglycidyl ether solution in 1,4-dioxane, the reactor was held at 90° C. for an additional 48 hours. At the end of the 48 hours of post reaction, the solution was recovered and rotary evaporated under vacuum for one hour at 90° C. then four hours at 150° C. and 2 mm Hg. The product was recovered (271.50 grams) as a light amber transparent solid at 25° C. Infrared spectrophotometric analysis of a film sample of the product on a sodium chloride plate demonstrated that complete conversion of epoxide groups had occurred. Titration of a portion of the product for total nitrogen content demonstrated the presence of 3.5864 milliequivalents N per gram of product. Titration of a portion of the product which had been acetylated with acetic anhydride for tertiary nitrogen content demonstrated the presence of 0.0848 milliequivalents tertiary N per gram of product. By difference, the total secondary amine content was calculated to be 3.5016 milliequivalents >N—H per gram of product.

EXAMPLE 2

Preparation of a Neat Resin Casting of the Diglycidyl Ether of 4,4'-Isopropylidenediphenol Cured with an Adduct from Aniline and Diglycidyl Ether of 4,4'-Dihydroxy-alpha-methylstilbene A portion (4.37 grams, 0.0249 epoxide equivalent) of a diglycidyl ether of 4,4'-isopropylidenediphenol having an epoxide equivalent weight of 175.6 was combined with a portion (7.23 grams, 0.0249 N—H equivalent) of the adduct from aniline and diglycidyl ether of 4,4'-dihydroxy-alpha-methylstilbene from Example 1-D. These components were then placed in an oven preheated to 120° C. and thoroughly mixed. After 10 minutes at 120° C., the resinous mixture was degassed in a vacuum bell jar and then poured into the reservoir of an injection molder preheated to 120° C. After 5 minutes in the reservoir, the resin was injected through a 0.0625 (1.5875 mm) inch square orifice into a mold preheated to 100° C. and having the following dimensions: 3.0 by 0.5 by 0.125 inch (76.2 by 12.7 by 3.175 mm). The filled mold was then immediately transferred to an oven preheated to 100° C. After two hours at 100° C., the oven temperature was increased to 110° C. where it was maintained for four hours before slowly cooling to room temperature (25° C.) Once at room temperature the casting released from the mold was translucent and microscopic examination at 70X magnification using a crossed polarized light source revealed a high level of birefringence. After lightly sanding the edges of the casting, it was tested for flexural properties. The flexural strength and modulus thus obtained were 20,310 psi (140.0 MPa) and 513,000 psi (3537.0 MPa), respectively. After reaching the maximum flexural stress of 20,310 Psi (140.0 MPa), the casting yielded rather than breaking. The glass transition temperature of the casting was measured by differential scanning calorimetry and was found to be 103° C. Differential scanning calorimetry also indicated that the casting was fully cured as no exothermic activity was observed up to the 300° C. end of the analysis. After completion of the flexural testing and differential scanning calorimetry, a 1.0 by 0.5 by 0.125 inch (25.4 by 12.7 by 3.175 mm) coupon weighing 1.2880 grams was cut from the casting and submerged in methylethylketone maintained at room temperature. After four hours of exposure to the methylethylketone, an 8.3 percent gain in weight was observed. After 24 hours of exposure, the gain in weight was 26.7 percent. The aforementioned procedure for injection molding a neat resin casting was repeated using a diglycidyl ether of 4,4'-isopropylidenediphenol (4.37 grams, 0.0243 epoxide equivalents) having an epoxide equivalent weight of 179.9 and the adduct of aniline and diglycidyl ether of 4,4'-dihydroxy-alpha-aniline methylstilbene from Example 1-D (7.05 grams, 0.0243 N—H equivalents). A Type V tensile piece was prepared from this casting in accordance with standard methods (ASTM D-638). The tensile modulus and maximum tensile strength obtained before yield were 427,000 psi (2944.1 MPa) and 11,860 psi (81.8 MPa), respectively. The percent elongation at the maximum tensile stress (11,860 psi) (81.8 MPa) was 12.1 and at break (8925 Psi) (61,54 MPa) was 26.6. The results thus obtained are summarized in Table I.

EXAMPLE 3

Preparation of a Neat Resin Casting of the Diglycidyl Ether of 4,4'-Dihydroxy-alpha-methylstilbene Cured with an Adduct from Aniline and Diglycidyl Ether of 4,4'-Dihydroxy-alpha-methylstilbene A portion (2.55 grams, 0.0142 epoxide equivalent) of a diglycidyl ether of 4,4'-dihydroxy-alpha-methylstilbene prepared using the method of Example 1-B and having an epoxide equivalent weight of 179.2 was placed in an oven preheated to 150° C. Ten minutes later, after melting had occurred, the oven temperature was reduced to 120° C. Once the 120° C. temperature was achieved, a portion (4.13 grams, 0.0142 N—H equivalent) of the adduct of aniline and diglycidyl ether of 4,4'-dihydroxy-alpha-methylstilbene from Example 1-D was added and thoroughly mixed therein. After 10 minutes at 120° C., the resinous mixture was degassed in a vacuum bell jar and then poured into the reservoir of an injection molder preheated to 120° C. After 5 minutes in the reservoir, the resin was injected through a 0.0625 inch (1.5875 mm) square orifice into a mold preheated to 100° C. and having the following dimensions: 3.0 by 0.5 by 0.125 inch (76.2 by 12.7 by 3.175 mm). The filled mold was then immediately transferred to an oven preheated to 100° C. After two hours at 100° C., the oven temperature was increased to 110° C. where it was maintained for four hours before slowly cooling to room temperature (25° C.) Once at room temperature the casting released from the mold was opaque and light beige in color. Microscopic examination of the flashing from this casting at 70X magnification using a crossed polarized light source revealed a high level of birefringence. After lightly sanding the edges of the casting, it was tested for flexural properties. The flexural strength and modulus thus obtained were 19,235 psi (132.6 MPa) and 515,000 psi (3550.8 MPa), respectively. After reaching the maximum flexural stress of 19,235 psi (132.6 MPa), the casting yielded rather than breaking. The glass transition temperature of the casting was measured by differential scanning calorimetry and was found to be 108° C. Differential scanning calorimetry also indicated that the casting was fully cured as no exochermic activity was observed up to the 300° C. end of the analysis. After completion of the flexural testing and differential scanning calorimetry, a 1.0 by 0.5 by 0.125 (25.4 by 12.7 by 3.175 mm) inch coupon weighing 1.2222 grams was cut from the casting and submerged in methylethylketone maintained at room temperature. After four hours of exposure to the methylethylketone, a 0.02 percent gain in weight was observed. After 24 hours of exposure, the gain in weight was 0.08 percent. The aforementioned procedure for injection molding a neat resin casting was repeated using the diglycidyl ether of 4,4'-dihydroxy-alpha-methylstilbene (2.57 grams, 0.0143 epoxide equivalents) having an epoxide equivalent weight of 179.2 and the adduct of aniline and diglycidyl ether of 4,4'-dihydroxy-alpha-methylstilbene from Example 1-D (4.17 grams, 0.0143 N-H equivalents). A Type V tensile piece was prepared from this casting in accordance with standard methods (ASTM D-638). The tensile modulus and maximum tensile strength obtained before yield were 442,000 psi (3047.5 MPa) and 11,740 psi (80.9 MPa), respectively. The percent elongation at the maximum tensile stress (11,740 psi) (80.9 MPa) was 3.6 and at break (9795 psi) (67.5 MPa) was 30.6. The results thus obtained are summarized in Table I.

COMPARATIVE EXAMPLE 2

Preparation of a Neat Resin Casting of the Diglycidyl Ether of 4,4'-Isopropylidenediphenol Cured with an Adduct of Aniline and Diglycidyl Ether of 4,4'-Isopropylidenediphenol A portion (4.35 grams, 0.0242 epoxide equivalents) of a diglycidyl ether of 4,4'-isopropylidenediphenol having an epoxide equivalent weight of 179.9 was combined with a portion (6.90 grams, 0.0242 N-H equivalents) of the adduct of aniline and diglycidyl ether of 4,4'-isopropylidenediphenol from Comparative Experiment 1. These components were then placed in a oven preheated to 120° C. and thoroughly mixed. After 10 minutes at 120° C., the resinous mixture was degassed in a vacuum bell jar and then poured into the reservoir of an injection molder preheated to 120° C. After 5 minutes in the reservoir, the resin was injected through a 0.0625 (1.5875 mm) inch square orifice into a mold preheated to 100° C. and having the following dimensions: 3.0 by 0.5 by 0.125 inch (76.2 by 12.7 by 3.175 mm). The filled mold was then immediately transferred to an oven preheated to 100° C. After two hours at 100° C., the oven temperature was increased to 110° C. where it was maintained for four hours before slowly cooling to room temperature (25° C.). Once at room temperature the casting released from the mold was translucent and microscopic examination at 70X magnification using a crossed polarized light source revealed a low level of birefringence. After lightly sanding the edges of the casting, it was tested for flexural properties. The flexural strength and modulus thus obtained were 13,375 psi (92.2 MPa) and 511,000 psi (3523.2 MPa), respectively. The glass transition temperature of the casting was measured by differential scanning calorimetry and was found to be 95° C. Differential scanning calorimetry also indicated that the casting was fully cured as no exothermic activity was observed up to the 300° C. end of the analysis. After completion of the flexural testing and differential scanning calorimetry, a 1.0 by 0.5 by 0.125 (25.4 by 12.7 by 3.175 mm) inch coupon weighing 1.2823 grams was cut from the casting and submerged in methylethylketone maintained at room temperature. After four hours, of exposure to the methylethylketone, the coupon had completely dissolved. The forementioned procedure for injection molding a neat resin casting was repeated using a diglycidyl ether of 4,4'-isopropylidenediphenol (4.35 grams, 0.0242 epoxide equivalents) having an epoxide equivalent weight of 179.9 and the adduct of aniline and diglycidyl ether of isopropylidenediphenol from Comparative Experiment 1 (6.90 grams, 0.0242 N—H equivalents). A Type V tensile piece was prepared from this casting in accordance with standard methods (ASTM D-638). The tensile modulus and maximum tensile strength obtained (at break) were 450,000 psi (3102.7 MPa) and 9725 psi (67.1 MPa), respectively. The percent elongation at the maximum tensile stress (9725 psi) (67.1 MPa) was 6.9. The results thus obtained are summarized in Table I.

EXAMPLE 4

Preparation of a Neat Resin Casting of the Diglycidyl Ether of 4,4'-Dihydroxy-alpha-methylstilbene Cured with an Adduct of Aniline and Diglycidyl Ether of 4,4'-Dihydroxy-alpha-methylstilbene: Use of an Alternate Injection Molding and Curing Procedure to Produce High Unidirectional Properties A portion (2.75 grams, 0.0155 epoxide equivalent) of a diglycidyl ether of 4,4'-dihydroxy-alpha-methylstilbene prepared using the method of Example 1-B above and having an epoxide equivalent weight of 176.81 was placed in an oven preheated to 150° C. Ten minutes later, after melting had occurred, the oven temperature was reduced to 120° C. Once the 120° C. temperature was achieved, a portion (4.43 grams, 0.0155 N—H equivalent) of adduct of aniline and diglycidyl ether of 4,4'-dihydroxy-alpha-methylstilbene prepared using the method of Example 1-D was added and thoroughly mixed therein. After 9 minutes at 120° C., the resinous mixture was degassed in a vacuum bell jar and then poured into the reservoir of an injection molder preheated to 120° C. After 5 minutes the temperature of the reservoir was reduced to 100° C. and then the resin was injected through a 0.020 inch by 0.375 inch (0.5 by 9.5 mm) rectangular flow gate into a mold preheated to 80° C. and having the following dimensions: 3.0 by 0.5 by 0.125 inch (76.2 by 12.7 by 3.175 mm). The filled mold was then immediately transferred to an oven preheated to 80° C. After four hours at 80° C., the oven temperature was increased 10° C. per hour to 110° C. where it was maintained for six hours before slowly cooling to room temperature (25° C.). Once at room temperature the casting was released from the mold. Microscopic examination of the flashing from this casting at 70X magnification using a crossed polarized light source revealed a high level of birefringence. For this casting, wide angle X-ray diffraction analysis was performed in order to determine if uniaxial molecular orientation had been induced. In this analysis, the casting was mounted in a flat plate pinhole X-ray camera and an X-ray diffraction pattern was obtained on Agfa D7 film following a 24 hour exposure. From the film thus obtained, an oriented reflection pattern was observed. The indicated direction of this orientation was the same as that of the resin flow into the mold during the preparation of the casting. Following X-ray diffraction analysis, the casting was tested for flexural properties. The flexural strength and modulus thus obtained were 25,024 psi (172.5 MPa) and 846,000 psi (5833.0 Mpa), respectively. After reaching the maximum flexural stress of 25,024 psi (172.5 MPa), the casting yielded rather than breaking. The glass transition temperature of the casting was measured by differential scanning calorimetry and was found to be 108° C. The aforementioned procedure for injection molding a neat resin casting was repeated using the diglycidyl ether of 4,4'-dihydroxy-alpha-methylstilbene (2.75 grams, 0.0155 epoxide equivalent) and the adduct of aniline and diglycidyl ether of 4,4'-dihydroxy-alpha-methylstilbene (4.43 grams, 0.0155 N—H equivalent). A Type V tensile test piece was prepared from this casting in accordance with standard methods (ASTM D-638). The tensile modulus and maximum tensile strength obtained before yield were 981,000 psi (6763.8 MPa) and 24,260 psi (167.3 MPa), respectively. The percent elongation at break was 17.2. The results thus obtained are summarized in Table I.

| Property Evaluated | Designation of Cured Epoxy Resin | | | |
|---|---|---|---|---|
| | Example 2 | Example 3 | Example 4 | Comparative Experiment 2 |
| Glass Transition Temperature (°C.) | 103 | 108 | 108 | 95 |
| Flexural Strength | | | | |
| (psi) | 20,310[a] | 19,235[a] | 25,024[a] | 13,375 |
| (MPa) | (140.0) | (132.6) | (172.5) | (93.2) |
| Flexural Modulus | | | | |
| (psi) | 513,000 | 515,000 | 846,000 | 511,000 |
| (MPa) | (3537.0) | (3550.8) | (5833.0) | (3523.2) |
| Tensile Strength | | | | |
| (psi) | 11,860 | 11,740 | 24,260 | 9,725 |
| (MPa) | (81.8) | (80.9) | (167.3) | (67.1) |
| Tensile Yield Strength | | | | |
| (psi) | 8925 | 9795 | no yield | no yield |
| (MPa) | (61.5) | (67.5) | | |
| Ultimate Elongation % | 26.6 | 30.6 | 17.2 | 6.9 |
| Elongation at Yield % | 12.1 | 3.6 | — | no yield |
| Tensile Modulus | | | | |
| (psi) | 427,000 | 442,000 | 981,000 | 450,000 |
| (MPa) | (2944.1) | (3047.5) | (6763.8) | (3102.7) |
| Methylethylketone Adsorption (% wt. gain) | | | | |
| 4 hours | 8.3 | 0.02 | not tested | dissolved |
| 24 hours | 26.7 | 0.08 | not tested | — |

[a]Ultimate strength before yielding

EXAMPLE 5

A. Preparation of Adduct of n-Butylamine and Diglycidyl Ether of 4,4'-Dihydroxy-alpha-methylstilbene n-Butylamine (548.55 grams, 7.5 moles) was added to a 2 liter reactor equipped with a cooled condenser (−5° C.) and stirred under a nitrogen atmosphere with heating to 60° C. A solution of the diglycidyl ether of 4,4'-dihydroxy-alpha-methylstilbene prepared using the method of Example I-B (176.809 epoxide equivalent weight) (85.94 grams, 0.486 epoxide equivalent) dissolved in 1,4-dioxane (400.0 grams) was pumped into the reactor at a rate of 0.9203 grams per minute while maintaining the 60° C. reaction temperature. After completion of addition of the diglycidyl ether solution in 1,4-dioxane, the reactor was held at 60° C. for an additional 24 hours. At the end of the 24 hours of post reaction, the solution was recovered and rotary evaporated under vacuum for one hour at 90° C. then four hours at 150° C. and 2 mm Hg. The product was recovered (118.40 grams) as a white solid at 25° C. Infrared spectrophotometric analysis of a film sample of the product on a sodium chloride plate demonstrated that complete conversion of epoxide groups had occurred Titration of a portion of the product for total nitrogen content demonstrated the presence of 3.8224 milliequivalents N per gram of product. Titration of a portion of the product which had been acetylated with acetic anhydride for tertiary nitrogen content demonstrated the presence of 0.0648 milliequivalents tertiary N per gram of product. By difference, the total secondary amine content was calculated to be 3.7576 milliequivalents >N—H per gram of product.

B. Preparation of a Neat Resin Casting of the Diglycidyl Ether of 4,4'-Dihydroxy-alpha-methylstilbene Cured With an Adduct of n-Butylamine and Diglycidyl Ether of 4,4'-Dihydroxy-alpha-methylstilbene A portion (1.000 gram, 0.00564 epoxide equivalent) of a diglycidyl ether of 4,4'-dihydroxy-alpha-methylstilbene prepared using the method of Example 1-B and having an epoxide equivalent weight of 177.25 was combined with a portion (1.5015 grams, 0.00564 N—H equivalent) of the adduct of n-butylamine and diglycidyl ether of 4,4'-dihydroxy-alpha-methylstilbene from A above. This mixture was ground to form a fine, homogeneous powder and then transferred to an aluminum cup. The aluminum cup was placed in an oven preheated to 150° C. where complete melting followed by gelation was observed within five minutes. After three hours at 150° C., the oven was slowly cooled to room temperature (25° C.). Once at room temperature, the casting recovered from the cup was translucent in appearance. Microscopic examination of the casting at 70X magnification using a crossed polarized light source revealed a high level of birefringence. Differential scanning calorimetry using a portion (15.0 milligrams) of the casting revealed a glass transition temperature at 65° C.

What is claimed is:

1. An unsubstituted sulfonamide compound containing at least one rodlike mesogenic moiety.

2. A sulfonamide of claim 1 wherein said rodlike mesogenic moiety is represented by the following Formulas XXI, XXIV or XXV

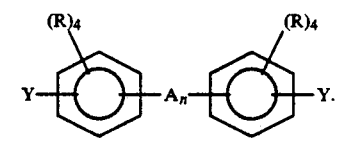

Formula XXI

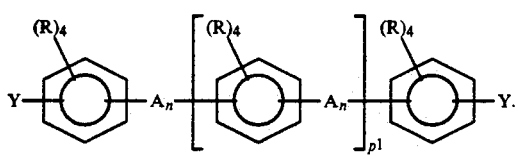

Formula XXIV

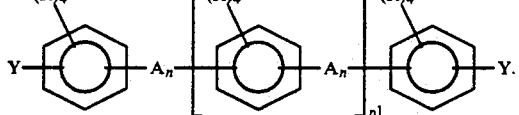

Formula XXV wherein each A is independently selected from the group consisting of a direct single bond, $-CR^1=CR^1-$, $-C\equiv C-$, $-N=N-$, $-CR^1=N-$, $-O-CO-$, $-NR^1-CO-$, $-CR^1=N-N=CR^1-$, $-CR^1=CR^1-CO-$, $-N=CR^1-$, $-CO-O-$, $-CO-NR^1-$, $-CO-CR^1=CR^1-$, $-CO-O-N=CR^1$, $-CR^1=N-O-OC-$, $-CO-NR^1-NR^1-OC-$, $-CR^1=CR^1-O-OC-$, $-CO-O-CR^1=CR^1-$, $-O-OC-CR^1=CR^1-$, $-CR^1=CR^1-CO-O-$, $-(CHR^1)_{n'}-O-CO-CR^1=CR^1-$, $-CR^1=CR^1-CO-O-(CHR^1)_{n'}-$, $-(CHR^1)_{n'}-CO-O-CR^1=CR^1-$, $-CR^1=CR^1-O-CO-(CHR^1)_{n'}-$, $-CO-S-$, $-S-OC-$, $-CH_2-CH_2-CO-O-$, $-O-OC-CH_2-CH_2-$, $-C=C-C=C-$, $-CR^1=CR^1-CR^1=CR^1-$,

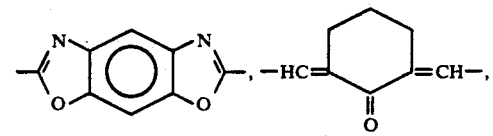

-continued

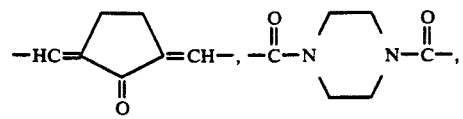

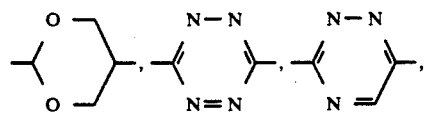

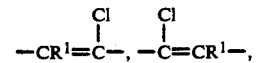

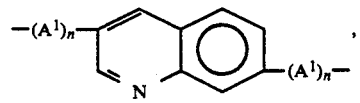

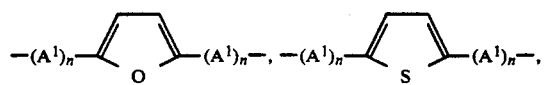

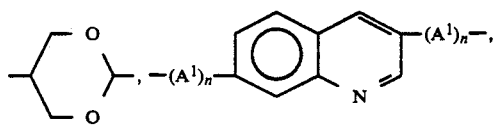

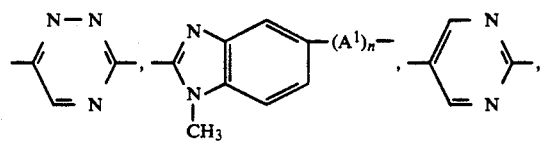

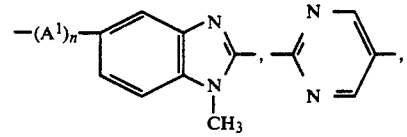

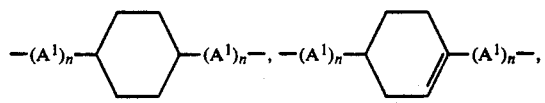

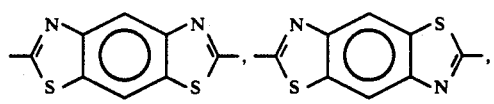

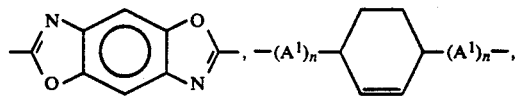

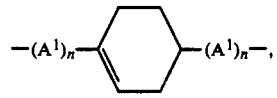

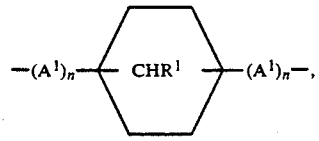

-continued

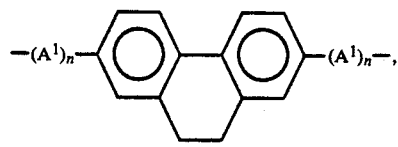

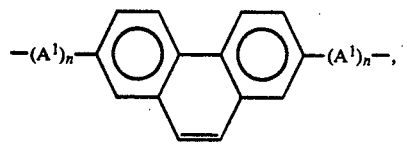

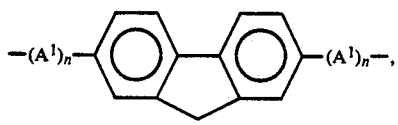

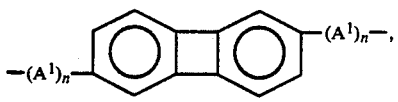

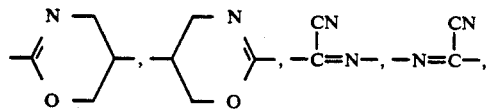

-continued

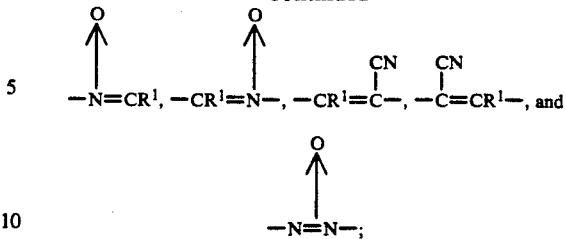

each A' is independently a divalent hydrocarbyl group having from 1 to about 10 carbon atoms; each $A^1$ is independently a

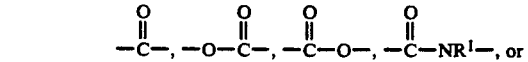

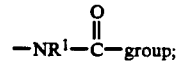

each R is independently hydrogen or a hydrocarbyl or hydrocarbyloxy group having from 1 to about 10 carbon atoms, a halogen atom, a nitro group, a nitrile group, a phenyl group or a —CO—$R^1$ group; each $R^1$ is independently hydrogen or a hydrocarbyl group having 1 to about 3 carbon atoms; one Y is a —$SO_2$—$NH_2$ group and the other Y is a hydrogen atom; n is zero or 1; n' has a value from 1 to about 6; $p^1$ has a value from 1 to about 30; and the aromatic rings can optionally contain one or more heteroatoms selected from the group consisting of N, O and S; with the proviso that at least 80% of the molecules are para substituted by both the bridging groups (—A— in Formulas XXI and XXIV, the direct bond in Formula XXV) and the sulfonamide group —$SO_2$—$NH_2$).

* * * * *